US012803028B2

(12) United States Patent
Sato et al.

(10) Patent No.: US 12,803,028 B2
(45) Date of Patent: Nov. 17, 2026

(54) REDOX FLOW BATTERY SYSTEM AND METHOD FOR OPERATING REDOX FLOW BATTERY SYSTEM

(71) Applicants: LE SYSTEM Co., Ltd., Tokyo (JP); Office Harada Co., Ltd., Tokyo (JP)

(72) Inventors: Junichi Sato, Kurume (JP); Tatsuro Harada, Tokyo (JP); Takeshi Sugita, Tsukuba (JP)

(73) Assignees: LE System Co., LTD., Kurume (JP); OFFICE HARADA CO., LTD., Tokyo (JP)

( * ) Notice: Subject to any disclaimer, the term of this patent is extended or adjusted under 35 U.S.C. 154(b) by 438 days.

(21) Appl. No.: 18/697,665

(22) PCT Filed: Nov. 26, 2021

(86) PCT No.: PCT/JP2021/043450
§ 371 (c)(1),
(2) Date: Apr. 1, 2024

(87) PCT Pub. No.: WO2023/053465
PCT Pub. Date: Apr. 6, 2023

(65) Prior Publication Data

US 2024/0405243 A1 Dec. 5, 2024

(30) Foreign Application Priority Data

Sep. 30, 2021 (JP) ................................ 2021-160389

(51) Int. Cl.
*H01M 8/18* (2006.01)
*H01M 8/04082* (2016.01)
(Continued)

(52) U.S. Cl.
CPC ....... *H01M 8/188* (2013.01); *H01M 8/04201* (2013.01); *H01M 8/04276* (2013.01); *H01M 8/2455* (2013.01)

(58) Field of Classification Search
CPC .... H01M 8/188; H01M 8/04; H01M 8/04201; H01M 8/04276
See application file for complete search history.

(56) References Cited

U.S. PATENT DOCUMENTS

2017/0098849 A1 4/2017 Kumamoto

FOREIGN PATENT DOCUMENTS

JP 2003007327 A 1/2003
JP 2016171688 A 9/2016
(Continued)

OTHER PUBLICATIONS

International Search Report (PCT/ISA/210) with translation and Written Opinion (PCT/ISA/237) mailed Jan. 11, 2022, by the Japan Patent Office as the International Searching Authority for International Application No. PCT/JP2021/043450. (8 pages).

*Primary Examiner* — Maria Laios
*Assistant Examiner* — Andrew Kim
(74) *Attorney, Agent, or Firm* — BUCHANAN, INGERSOLL & ROONEY PC

(57) ABSTRACT

A redox flow battery system includes redox flow charging cells to perform charging with power from at least one power source type, individual storages, a common storage, and a controller. Each of the individual storages stores an electrolyte charged with power only from a power source type. The common storage stores an electrolyte charged with power from power source types. The controller switches an electrolyte charged by the redox flow charging cell between an electrolyte in the individual storage and an electrolyte in the common storage and switches an electrolyte charged by
(Continued)

the redox flow charging cell between an electrolyte in the individual storage and an electrolyte in the common storage.

5 Claims, 9 Drawing Sheets

(51) Int. Cl.
*H01M 8/04276* (2016.01)
*H01M 8/2455* (2016.01)

(56) References Cited

FOREIGN PATENT DOCUMENTS

| | | | |
|---|---|---|---|
| JP | 2021012787 | A | 2/2021 |
| WO | 2015182339 | A1 | 12/2015 |

REDOX FLOW BATTERY SYSTEM AND METHOD FOR OPERATING REDOX FLOW BATTERY SYSTEM

TECHNICAL FIELD

The present disclosure relates to a redox flow battery system and a method for operating the redox flow battery system.

BACKGROUND ART

A redox flow battery system including a charging cell to perform charging with power and a discharging cell to discharge power with which charging is performed has been known. For example, Patent Literature 1 discloses a power storage system that includes a redox flow battery including a plurality of cells, a connection switching mechanism to switch at least some of the plurality of cells in the redox flow battery between a charging state of being connected to an electricity supply system and a discharging state of being connected to an electricity demand system, an electrolyte housing to house an electrolyte in the redox flow battery, and electrolyte feeding means for flowing an electrolyte to each cell. The power storage system in Patent Literature 1 is capable of continuously executing charging and discharge in parallel since the plurality of cells in the redox flow battery is divided into cells to perform charging with power and cells to discharge power with which charging is performed.

On the other hand, power consumers include a power consumer requesting power supply 100% based on renewable energy (RE100) from a viewpoint of an environmental value, a power consumer requesting stable power supply regardless of a power source type (the source of power, such as power generation from renewable energy and power generation by thermal power generation), and the like.

CITATION LIST

Patent Literature

Patent Literature 1: Unexamined Japanese Patent Application Publication No. 2003-7327

SUMMARY OF INVENTION

Technical Problem

The power storage system in Patent Literature 1 includes only one electrolyte housing. Therefore, in the power storage system in Patent Literature 1, it is difficult to supply power to which coloring is applied (power the source of which is distinguished from the others) in response to a request from a power consumer.

The present disclosure has been made in consideration of the above-described circumstances, and an objective of the present disclosure is to provide a redox flow battery system and a method for operating the redox flow battery system capable of supplying a power consumer with power to which coloring is applied and effectively utilizing surplus power.

Solution to Problem

In order to achieve the above-described objective, a redox flow battery system according to a first aspect of the present disclosure includes:

- at least one redox flow charging cell connected to at least one power source type and configured to perform charging with power from the at least one power source type;
- at least one redox flow discharging cell to discharge the power with which charging is performed by the redox flow charging cell;
- a plurality of individual storages each to store an electrolyte that is charged with the power only from one power source type by the redox flow charging cell and circulate the electrolyte to the redox flow charging cell and the at least one redox flow discharging cell;
- a common storage to store an electrolyte that is charged with power from at least two power source types by the redox flow charging cell and circulate the electrolyte to the redox flow charging cell and the at least one redox flow discharging cell; and
- a controller to switch an electrolyte that is charged by the redox flow charging cell between an electrolyte in one of the individual storages and an electrolyte in the common storage.

A method for operating a redox flow battery system according to a second aspect of the present disclosure includes:

- circulating, to at least one redox flow charging cell connected to at least one power source type and configured to perform charging with power from the at least one power source type, an electrolyte that is charged with the power only from one power source type and charging the electrolyte with the power;
- switching an electrolyte that circulates in the redox flow charging cell from the electrolyte that is charged with the power only from the one power source type to an electrolyte that is charged with the power from at least two power source types;
- charging a switched electrolyte, the electrolyte being charged with the power from the at least two power source types, with the power by the redox flow charging cell; and
- circulating one of the electrolyte that is charged with the power only from the one power source type and the electrolyte that is charged with the power from the at least two power source types to a redox flow discharging cell and discharging the power with which charging is performed from the redox flow discharging cell.

Advantageous Effects of Invention

According to the present disclosure, power to which coloring is applied can be supplied to a power consumer and surplus power can be effectively utilized.

DESCRIPTION OF EMBODIMENTS

A redox flow battery system according to embodiments is described below with reference to the drawings.

Embodiment 1

A redox flow battery system 10 according to the present embodiment is described with reference to FIGS. 1 to 8.

Figure 1:
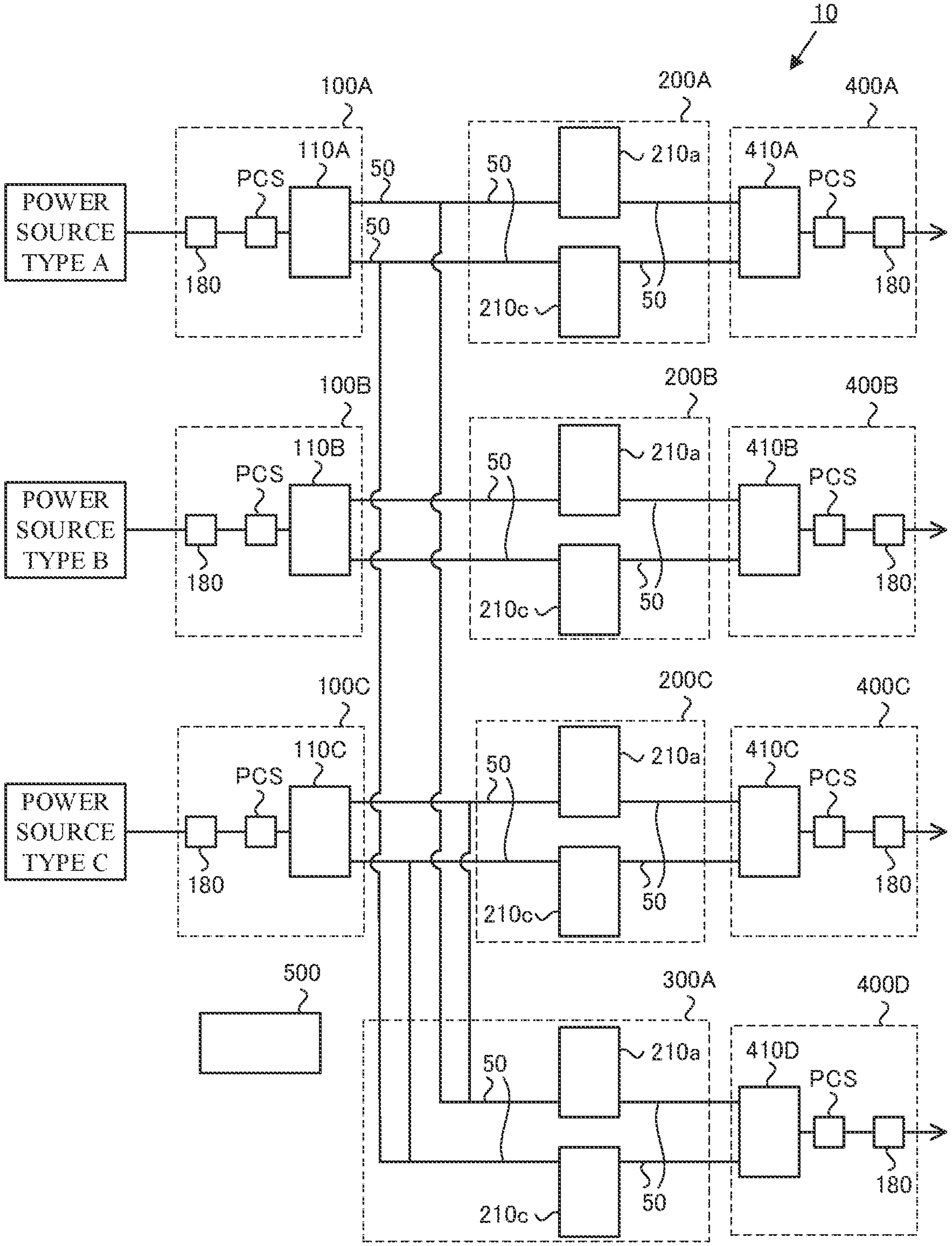
FIG. 1 is a schematic diagram of a redox flow battery system according to Embodiment 1.

A redox flow battery system 10 supplies power consumers with power to which coloring is applied. The redox flow battery system 10 includes, as illustrated in FIG. 1, first to third redox flow chargers 100A to 100C, first to third individual storages 200A to 200C, a first common storage 300A, first to fourth redox flow dischargers 400A to 400D, and a controller 500.

Each of the first to third redox flow chargers 100A to 100C is connected to a predetermined power source type (power generation from renewable energy, power generation by thermal power generation, on-site solar power generation, off-site solar power generation, or the like) and performs charging with power from the predetermined power source type. Each of the first to third individual storages 200A to 200C stores a positive electrode electrolyte PL and a negative electrode electrolyte NL that are charged with power only from a predetermined power source type by a corresponding one of the first to third redox flow chargers 100A to 100C. In addition, each of the first to third individual storages 200A to 200C circulates the positive electrode electrolyte PL and the negative electrode electrolyte NL that the individual storage stores to a corresponding one of the first to third redox flow chargers 100A to 100C. Further, each of the first to third individual storages 200A to 200C circulates the positive electrode electrolyte PL and the negative electrode electrolyte NL that the individual storage stores to a corresponding one of the first to third redox flow dischargers 400A to 400C.

The first common storage 300A stores a positive electrode electrolyte PL and a negative electrode electrolyte NL that are charged with power from two power source types by the first redox flow charger 100A and the third redox flow charger 100C. The first common storage 300A circulates the positive electrode electrolyte PL and the negative electrode electrolyte NL that the first common storage 300A stores to each of the first redox flow charger 100A and the third redox flow charger 100C. In addition, the first common storage 300A circulates the positive electrode electrolyte PL and the negative electrode electrolyte NL that the first common storage 300A stores to the fourth redox flow discharger 400D.

Each of the first to third redox flow dischargers 400A to 400C receives a circulation of the positive electrode electrolyte PL and the negative electrode electrolyte NL from a corresponding one of the first to third individual storages 200A to 200C and discharges power with which charging is performed by a corresponding one of the first to third redox flow chargers 100A to 100C. The fourth redox flow discharger 400D receives a circulation of the positive electrode electrolyte PL and the negative electrode electrolyte NL from the first common storage 300A and discharges power with which charging is performed by the first redox flow charger 100A and the third redox flow charger 100C. Each of the first to fourth redox flow dischargers 400A to 400D supplies one of the power consumers with power by discharge. The controller 500 controls each unit. The controller 500 switches the positive electrode electrolyte PL and the negative electrode electrolyte NL that are charged by the first redox flow charger 100A between the positive electrode electrolyte PL and the negative electrode electrolyte NL in the first individual storage 200A and the positive electrode electrolyte PL and the negative electrode electrolyte NL in the first common storage 300A. In addition, the controller 500 switches the positive electrode electrolyte PL and the negative electrode electrolyte NL that are charged by the third redox flow charger 100C between the positive electrode electrolyte PL and the negative electrode electrolyte NL in the third individual storage 200C and the positive electrode electrolyte PL and the negative electrode electrolyte NL in the first common storage 300A. Note that in FIG. 1, to facilitate understanding, some of the components are omitted or simplified.

In the present embodiment, a redox flow battery in which vanadium ions are used as an active material in the positive electrode electrolyte PL and the negative electrode electrolyte NL is described as an example. In addition, the positive electrode electrolyte PL and the negative electrode electrolyte NL are collectively referred to as electrolytes.

(Redox Flow Charger)

(First Redox Flow Charger)

The first redox flow charger 100A includes, as illustrated in FIG. 1, a first redox flow charging cell 110A, a power meter 180, and a power conditioner PCS. The first redox flow charger 100A is connected to a power source type A and performs charging with power from the power source type A. The power source type A is, for example, an on-site renewable energy power source. The first redox flow charger 100A charges the electrolytes in the first individual storage 200A and the electrolytes in the first common storage 300A with power. As described later, since electrolytes that circulate in the first redox flow charging cell 110A and are charged with power are switched between the electrolytes in the first individual storage 200A and the electrolytes in the first common storage 300A by the controller 500, the first redox flow charger 100A charges one of the electrolytes in the first individual storage 200A and the electrolytes in the first common storage 300A with power at the time of charging.

The electrolytes that circulate in the first redox flow charging cell 110A are switched based on, for example, charging depth (also referred to as a state of charge (SOC)) of the electrolytes in the first individual storage 200A. For example, when the charging depth of the electrolytes in the first individual storage 200A is greater than or equal to a predetermined first threshold value (for example, 80%), the electrolytes that circulate in the first redox flow charging cell 110A are switched from the electrolytes in the first individual storage 200A to the electrolytes in the first common storage 300A. Because of this configuration, surplus power from the power source type A, which is an on-site renewable energy power source, can be effectively utilized. In addition, development of a precipitate from the electrolytes can be suppressed.

Since the electrolytes in the first individual storage 200A circulate to the first redox flow discharger 400A and discharge power, the first redox flow charger 100A, the first individual storage 200A, and the first redox flow discharger 400A are equivalent to one redox flow battery. In addition, since the electrolytes in the first common storage 300A circulate to the fourth redox flow discharger 400D and discharge power, the first redox flow charger 100A, the first common storage 300A, and the fourth redox flow discharger 400D are also equivalent to one redox flow battery.

Figure 2:
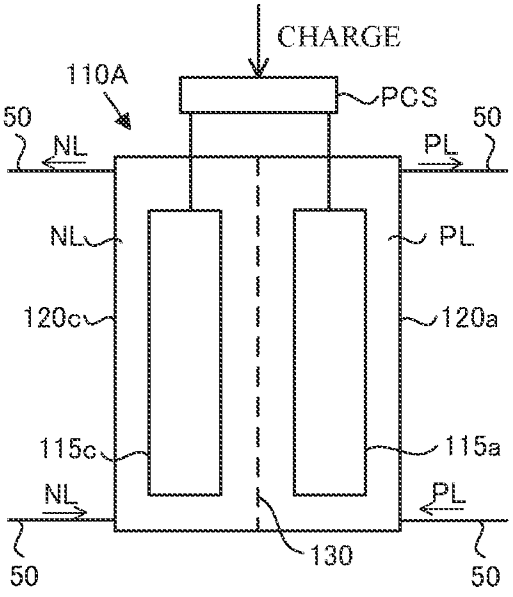
FIG. 2 is a schematic diagram illustrating a first redox flow charging cell according to Embodiment 1.

The first redox flow charging cell 110A is connected to the power source type A via the power meter 180 and the power conditioner PCS. The first redox flow charging cell 110A charges electrolytes with power from the power source type A. The first redox flow charging cell 110A includes, as illustrated in FIG. 2, a positive electrode 115*a*, a positive electrode chamber 120*a*, a negative electrode 115*c*, a negative electrode chamber 120*c*, and a membrane 130.

For the positive electrode 115*a*, for example, a carbon fiber electrode is used. The positive electrode 115*a* is arranged in the positive electrode chamber 120*a*. The positive electrode chamber 120*a* has the positive electrode 115*a* arranged therein. The positive electrode chamber 120*a* is separated from the negative electrode chamber 120*c* by the membrane 130. The positive electrode electrolyte PL in the first individual storage 200A or the first common storage 300A circulates in the positive electrode chamber 120*a* via pipes 50 connected to the first individual storage 200A or the first common storage 300A. In the positive electrode chamber 120*a*, tetravalent vanadium ions in the positive electrode electrolyte PL are oxidized to pentavalent vanadium ions (charging).

For the negative electrode 115*c*, for example, a carbon fiber electrode is used. The negative electrode 115*c* is arranged in the negative electrode chamber 120*c*. The negative electrode chamber 120*c* has the negative electrode 115*c* arranged therein. The negative electrode chamber 120*c* is separated from the positive electrode chamber 120*a* by the membrane 130. The negative electrode electrolyte NL in the first individual storage 200A or the first common storage 300A circulates in the negative electrode chamber 120*c* via pipes 50 connected to the first individual storage 200A or the first common storage 300A. In the negative electrode chamber 120*c*, trivalent vanadium ions in the negative electrode electrolyte NL are reduced to bivalent vanadium ions (charging).

The membrane 130 is an ion exchange membrane. The membrane 130 separates the positive electrode chamber 120*a* and the negative electrode chamber 120*c* from each other and allows predetermined ions to permeate.

The first redox flow charging cell 110A is used as a cell stack in which the first redox flow charging cells 110A are stacked. The cells are stacked by, for example, stacking cell frames each having a bipolar plate installed therein, positive electrodes 115*a*, membranes 130, and negative electrodes 115*c*. By a positive electrode 115*a* and a negative electrode 115*c* being arranged on one surface side and the other surface side of a bipolar plate, respectively, a first redox flow charging cell 110A is located between cell frames adjacent to each other. The positive electrode electrolyte PL and the negative electrode electrolyte NL circulate through a manifold in a frame body of the cell frame, a frame body supporting the positive electrode 115*a*, a frame body supporting the negative electrode 115*c*, and the like. Note that a known configuration is appropriately usable as a configuration of the first redox flow charging cell 110A.

The power meter 180 measures the amount of power with which charging is performed from the power source type A. The power meter 180 transmits a measured value of the amount of power to the controller 500.

The power conditioner PCS controls charging performed by the first redox flow charging cell 110A, based on an instruction from the controller 500. The power conditioner PCS includes an AC/DC converter, a DC/DC converter, and the like.

(Second Redox Flow Charger)

The second redox flow charger 100B includes, as illustrated in FIG. 1, a second redox flow charging cell 110B, a power meter 180, and a power conditioner PCS. The second redox flow charger 100B is connected to a power source type B and performs charging with power from the power source type B. The power source type B is, for example, an off-site renewable energy power source. The second redox flow charger 100B charges the electrolytes in the second individual storage 200B with power. Since the electrolytes in the second individual storage 200B circulate to the second redox flow discharger 400B and discharge power, the second redox flow charger 100B, the second individual storage 200B, and the second redox flow discharger 400B are equivalent to one redox flow battery.

The second redox flow charging cell 110B is connected to the power source type B via the power meter 180 and the power conditioner PCS. The second redox flow charging cell 1101B charges the electrolytes with power from the power source type B. The second redox flow charging cell 110B, as with the first redox flow charging cell 110A, includes a positive electrode 115*a*, a positive electrode chamber 120*a*, a negative electrode 115*c*, a negative electrode chamber 120*c*, and a membrane 130.

In the second redox flow charging cell 110B, the positive electrode electrolyte PL in the second individual storage 200B circulates in the positive electrode chamber 120*a* via pipes 50 connected to the second individual storage 200B. In addition, the negative electrode electrolyte NL in the second individual storage 200B circulates in the negative electrode chamber 120*c* via pipes 50 connected to the second individual storage 200B. A configuration of the other part of the second redox flow charging cell 110B is the same as that of the first redox flow charging cell 110A.

The power meter 180 of the second redox flow charger 100B measures the amount of power with which charging is performed from the power source type B. The power conditioner PCS of the second redox flow charger 100B controls charging performed by the second redox flow charging cell 110B, based on an instruction from the controller 500.

(Third Redox Flow Charger)

The third redox flow charger 100C includes, as illustrated in FIG. 1, a third redox flow charging cell 110C, a power meter 180, and a power conditioner PCS. The third redox flow charger 100C is connected to a power source type C and performs charging with power from the power source type C. The power source type C is, for example, a wholesale power market. The third redox flow charger 100C charges the electrolytes in the third individual storage 200C and the electrolytes in the first common storage 300A with power. As described later, since electrolytes that circulate in the third redox flow charging cell 110C and are charged with power are switched between the electrolytes in the third individual storage 200C and the electrolytes in the first common storage 300A by the controller 500, the third redox flow charger 100C charges one of the electrolytes in the third individual storage 200C and the electrolytes in the first common storage 300A with power at the time of charging.

The electrolytes circulating in the third redox flow charging cell 110C is switched based on, for example, a price of power procured from the wholesale power market and charging depth of the electrolytes in the third individual storage 200C. For example, when the price of power procured from the wholesale power market is less expensive than a predetermined first price and the charging depth of the electrolytes in the third individual storage 200C is greater than or equal to the predetermined first threshold value, the electrolytes that circulate in the third redox flow charging cell 110C is switched from the electrolytes in the third individual storage 200C to the electrolytes in the first common storage 300A. Because of this configuration, surplus power can be effectively utilized and power can be provided at an inexpensive price as well.

The third redox flow charger 100C, the third individual storage 200C, and the third redox flow discharger 400C are equivalent to one redox flow battery. In addition, the third redox flow charger 100C, the first common storage 300A, and the fourth redox flow discharger 400D are also equivalent to one redox flow battery.

The third redox flow charging cell 110C is connected to the power source type C via the power meter 180 and the power conditioner PCS. The third redox flow charging cell 110C charges the electrolytes with power from the power source type C. The third redox flow charging cell 110C, as with the first redox flow charging cell 110A, includes a positive electrode 115*a*, a positive electrode chamber 120*a*, a negative electrode 115*c*, a negative electrode chamber 120*c*, and a membrane 130.

The positive electrode electrolyte PL in the third individual storage 200C or the first common storage 300A circulates in the positive electrode chamber 120*a* via pipes 50 connected to the third individual storage 200C or the first common storage 300A. In addition, the negative electrode electrolyte NL in the third individual storage 200C or the first common storage 300A circulates in the negative electrode chamber 120*c* via pipes 50 connected to the third individual storage 200C or the first common storage 300A. A configuration of the other part of the third redox flow charging cell 110C is the same as that of the first redox flow charging cell 110A.

The power meter 180 of the third redox flow charger 100C measures the amount of power with which charging is performed from the power source type C. The power conditioner PCS of the third redox flow charger 100C controls charging performed by the third redox flow charging cell 110C, based on an instruction from the controller 500.

(Individual Storage)

(First Individual Storage)

Figure 3:
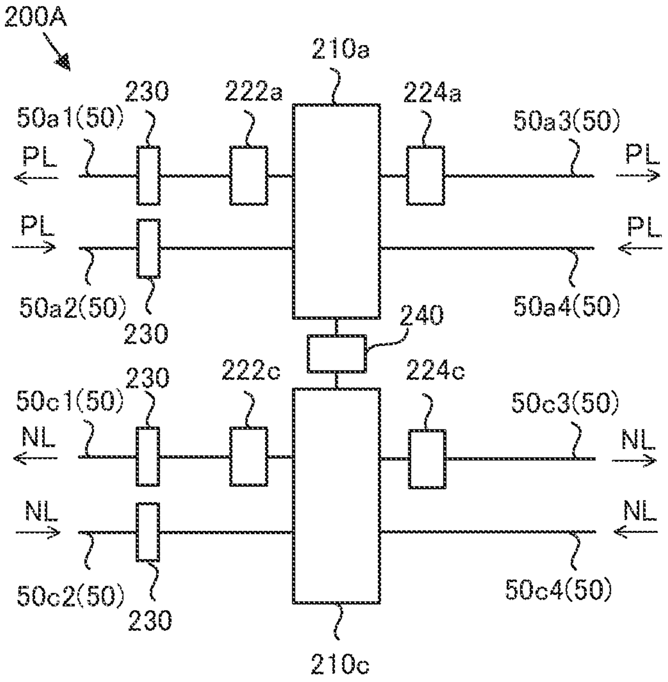
FIG. 3 is a schematic diagram illustrating a first individual storage according to Embodiment 1.

The first individual storage 200A stores electrolytes that are charged with power only from the power source type A by the first redox flow charger 100A. The first individual storage 200A circulates the electrolytes that the first individual storage 200A stores to the first redox flow charger 100A. The first individual storage 200A also circulates the electrolytes that the first individual storage 200A stores to the first redox flow discharger 400A. Therefore, in the first individual storage 200A, electrolytes to which coloring specifying the power source type A (on-site renewable energy), to which the first redox flow charger 100A is connected, is applied are stored. The first individual storage 200A includes, as illustrated in FIG. 3, pipes 50, a positive electrode electrolyte storage tank 210*a*, positive electrode pumps 222*a* and 224*a*, a negative electrode electrolyte storage tank 210*c*, negative electrode pumps 222*c* and 224*c*, electromagnetic valves 230, and an open circuit voltage measurer 240.

The pipes 50 connect the positive electrode electrolyte storage tank 210*a* to the positive electrode chamber 120*a* of the first redox flow charging cell 110A and a positive electrode chamber 120*a* of a first redox flow discharging cell 410A, which is described later. The pipes 50 also connect the negative electrode electrolyte storage tank 210*c* to the negative electrode chamber 120*c* of the first redox flow charging cell 110A and a negative electrode chamber 120*c* of the first redox flow discharging cell 410A, which is described later. The pipes 50 include pipes 50*a*1 to 50*a*4 and pipes 50*c*1 to 50*c*4.

The pipes 50*a*1 and 50*a*2 connect the positive electrode electrolyte storage tank 210*a* to the positive electrode chamber 120*a* of the first redox flow charging cell 110A. The pipe 50*a*1 feeds the positive electrode electrolyte PL to the positive electrode chamber 120*a* of the first redox flow charging cell 110A. The pipe 50*a*2 retrieves the positive electrode electrolyte PL from the positive electrode chamber 120*a* of the first redox flow charging cell 110A. To the pipe 50*a*1, the positive electrode pump 222*a* and an electromagnetic valve 230 are installed. To the pipe 50*a*2, another electromagnetic valve 230 is installed.

The pipes 50*a*3 and 50*a*4 connect the positive electrode electrolyte storage tank 210*a* to the positive electrode chamber 120*a* of the first redox flow discharging cell 410A. The pipe 50*a*3 feeds the positive electrode electrolyte PL to the positive electrode chamber 120*a* of the first redox flow discharging cell 410A. The pipe 50*a*4 retrieves the positive electrode electrolyte PL from the positive electrode chamber 120*a* of the first redox flow discharging cell 410A. To the pipe 50*a*3, the positive electrode pump 224*a* is installed.

The pipes 50*c*1 and 50*c*2 connect the negative electrode electrolyte storage tank 210*c* to the negative electrode chamber 120*c* of the first redox flow charging cell 110A. The pipe 50*c*1 feeds the negative electrode electrolyte NL to the negative electrode chamber 120*c* of the first redox flow charging cell 110A. The pipe 50*c*2 retrieves the negative electrode electrolyte NL from the negative electrode chamber 120*c* of the first redox flow charging cell 110A. To the pipe 50*c*1, the negative electrode pump 222*c* and an electromagnetic valve 230 are installed. To the pipe 50*c*2, another electromagnetic valve 230 is installed.

The pipes 50*c*3 and 50*c*4 connect the negative electrode electrolyte storage tank 210*c* to the negative electrode chamber 120*c* of the first redox flow discharging cell 410A. The pipe 50*c*3 feeds the negative electrode electrolyte NL to the negative electrode chamber 120*c* of the first redox flow discharging cell 410A. The pipe 50*c*4 retrieves the negative electrode electrolyte NL from the negative electrode chamber 120*c* of the first redox flow discharging cell 410A. To the pipe 50*c*3, the negative electrode pump 224*c* is installed.

The positive electrode electrolyte storage tank 210*a* stores the positive electrode electrolyte PL that is charged only by the first redox flow charger 100A. The positive electrode electrolyte PL stored in the positive electrode electrolyte storage tank 210*a* circulates, via the pipes 50, in the positive electrode chamber 120*a* of the first redox flow charging cell 110A and the positive electrode chamber 120*a* of the first redox flow discharging cell 410A.

The positive electrode pump 222*a* is installed to the pipe 50*a*1. The positive electrode pump 222*a* circulates the positive electrode electrolyte PL to the positive electrode chamber 120*a* of the first redox flow charging cell 110A. The positive electrode pump 222*a*, under the control of the controller 500, controls a flow rate of the positive electrode electrolyte PL that circulates in the positive electrode chamber 120*a* of the first redox flow charging cell 110A.

The positive electrode pump 224*a* is installed to the pipe 50*a*3. The positive electrode pump 224*a* circulates the positive electrode electrolyte PL to the positive electrode chamber 120*a* of the first redox flow discharging cell 410A. The positive electrode pump 224*a*, under the control of the controller 500, controls a flow rate of the positive electrode electrolyte PL that circulates in the positive electrode chamber 120*a* of the first redox flow discharging cell 410A.

The negative electrode electrolyte storage tank 210*c* stores the negative electrode electrolyte NL that is charged only by the first redox flow charger 100A. The negative electrode electrolyte NL stored in the negative electrode electrolyte storage tank 210*c* circulates, via the pipes 50, in the negative electrode chamber 120*c* of the first redox flow charging cell 110A and the negative electrode chamber 120*c* of the first redox flow discharging cell 410A. The negative electrode electrolyte storage tank 210*c* is connected to the pipes 50.

The negative electrode pump 222*c* is installed to the pipe 50*c*1. The negative electrode pump 222*c* circulates the negative electrode electrolyte NL to the negative electrode chamber 120*c* of the first redox flow charging cell 110A. The negative electrode pump 222*c*, under the control of the controller 500, controls a flow rate of the negative electrode electrolyte NL that circulates in the negative electrode chamber 120*c* of the first redox flow charging cell 110A.

The negative electrode pump 224*c* is installed to the pipe 50*c*3. The negative electrode pump 224*c* circulates the negative electrode electrolyte NL to the negative electrode chamber 120*c* of the first redox flow discharging cell 410A. The negative electrode pump 224*c*, under the control of the controller 500, controls a flow rate of the negative electrode electrolyte NL that circulates in the negative electrode chamber 120*c* of the first redox flow discharging cell 410A.

The electromagnetic valves 230 are installed to the pipes 50*a*1, 50*a*2, 50*c*1, and 50*c*2. The electromagnetic valves 230, under the control of the controller 500, open and close the pipes 50 (the pipes 50*a*1, 50*a*2, 50*c*1, and 50*c*2) that connect the positive electrode electrolyte storage tank 210*a* and the negative electrode electrolyte storage tank 210*c* to the first redox flow charging cell 110A (the positive electrode chamber 120*a* and the negative electrode chamber 120*c*), respectively.

Specifically, when the electrolytes that are to be charged by the first redox flow charging cell 110A are switched from the electrolytes in the first individual storage 200A to the electrolytes in the first common storage 300A, the electromagnetic valves 230 close the pipes 50 that connect the positive electrode electrolyte storage tank 210*a* and the negative electrode electrolyte storage tank 210*c* to the first redox flow charging cell 110A. In addition, when the electrolytes that are to be charged by the first redox flow charging cell 110A are switched from the electrolytes in the first common storage 300A to the electrolytes in the first individual storage 200A, the electromagnetic valves 230 open the pipes 50 that connect the positive electrode electrolyte storage tank 210*a* and the negative electrode electrolyte storage tank 210*c* to the first redox flow charging cell 110A.

The open circuit voltage measurer 240 measures a potential difference between the positive electrode electrolyte PL stored in the positive electrode electrolyte storage tank 210*a* and the negative electrode electrolyte NL stored in the negative electrode electrolyte storage tank 210*c*, that is, open circuit voltage (OCV) of the stored electrolytes. The open circuit voltage measurer 240 transmits a measured value of the open circuit voltage to the controller 500.

(Second Individual Storage)

The second individual storage 200B stores electrolytes that are charged with power only from the power source type B by the second redox flow charger 100B. The second individual storage 200B circulates the electrolytes that the second individual storage 200B stores to the second redox flow charger 100B. The second individual storage 200B also circulates the electrolytes that the second individual storage 200B stores to the second redox flow discharger 400B. Therefore, in the second individual storage 200B, electrolytes to which coloring specifying the power source type B (off-site renewable energy), to which the second redox flow charger 100B is connected, is applied are stored. The second individual storage 200B includes pipes 50, a positive electrode electrolyte storage tank 210*a*, positive electrode pumps 222*a* and 224*a*, a negative electrode electrolyte storage tank 210*c*, negative electrode pumps 222*c* and 224*c*, and an open circuit voltage measurer 240. A configuration of the second individual storage 200B is the same as the configuration of the first individual storage 200A except that the second individual storage 200B does not include electromagnetic valves 230 and circulates electrolytes that the second individual storage 200B stores to the second redox flow charger 100B and the second redox flow discharger 400B.

(Third Individual Storage)

The third individual storage 200C stores electrolytes that are charged with power only from the power source type C by the third redox flow charger 100C. The third individual storage 200C circulates the electrolytes that the third individual storage 200C stores to the third redox flow charger 100C. The third individual storage 200C also circulates the electrolytes that the third individual storage 200C stores to the third redox flow discharger 400C. Therefore, in the third individual storage 200C, electrolytes to which coloring specifying the power source type C, to which the third redox flow charger 100C is connected, is applied are stored. The third individual storage 200C includes pipes 50, a positive electrode electrolyte storage tank 210*a*, positive electrode pumps 222*a* and 224*a*, a negative electrode electrolyte storage tank 210*c*, negative electrode pumps 222*c* and 224*c*, electromagnetic valves 230, and an open circuit voltage measurer 240. A configuration of the third individual storage 200C is the same as the configuration of the first individual storage 200A except that the third individual storage 200C circulates the electrolytes that the third individual storage 200C stores to the third redox flow charger 100C and the third redox flow discharger 400C.

(First Common Storage)

Figure 4:
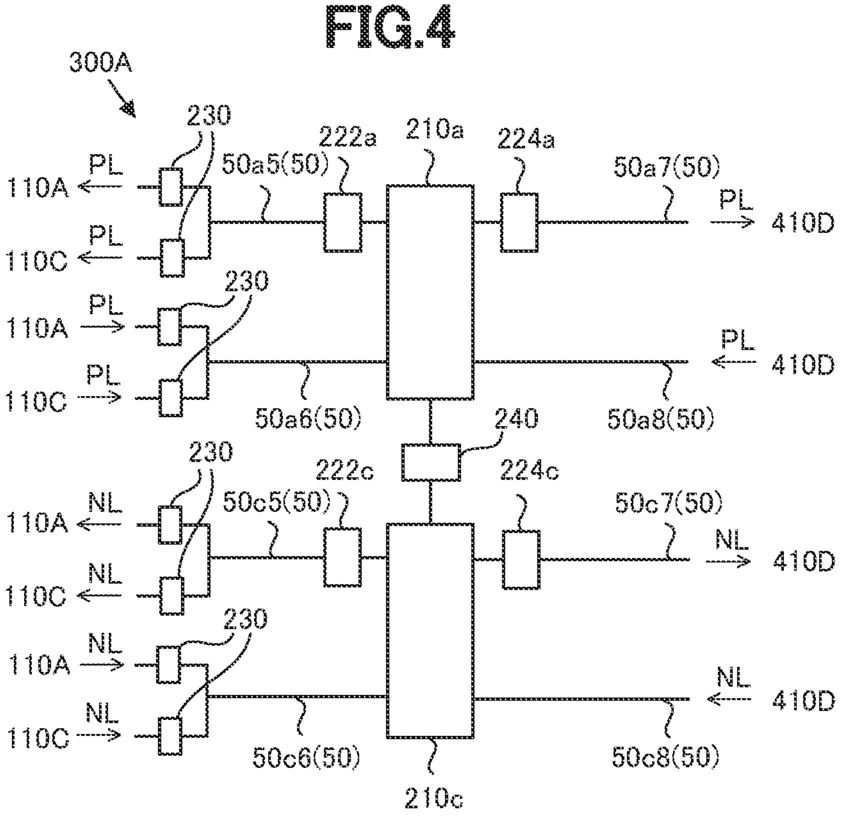
FIG. 4 is a schematic diagram illustrating a first common storage according to Embodiment 1.

The first common storage 300A stores electrolytes that are charged with power from the power source types A and C by the first redox flow charger 100A and the third redox flow charger 100C, respectively. The first common storage 300A circulates the electrolytes that the first common storage 300A stores to each of the first redox flow charger 100A and the third redox flow charger 100C. The first common storage 300A also circulates the electrolytes that the first common storage 300A stores to the fourth redox flow discharger 400D. The first common storage 300A includes, as illustrated in FIG. 4, pipes 50, a positive electrode electrolyte storage tank 210*a*, positive electrode pumps 222*a* and 224*a*, a negative electrode electrolyte storage tank 210*c*, negative electrode pumps 222*c* and 224*c*, electromagnetic valves 230, and an open circuit voltage measurer 240.

The pipes 50 of the first common storage 300A connect the positive electrode electrolyte storage tank 210*a* of the first common storage 300A to the positive electrode chamber 120*a* of the first redox flow charging cell 110A, the positive electrode chamber 120*a* of the third redox flow charging cell 110C, and a positive electrode chamber 120*a* of a fourth redox flow discharging cell 410D, which is described later. The pipes 50 of the first common storage 300A also connect the negative electrode electrolyte storage tank 210*c* of the first common storage 300A to the negative electrode chamber 120*c* of the first redox flow charging cell 110A, the negative electrode chamber 120*c* of the third redox flow charging cell 110C, and a negative electrode chamber 120*c* of the fourth redox flow discharging cell 410D, which is described later. The pipes 50 include pipes 50*a*5 to 50*a*8 and pipes 50*c*5 to 50*c*8.

Each of the pipes 50*a*5 and 50*a*6 branches and connects the positive electrode electrolyte storage tank 210*a* of the first common storage 300A to each of the positive electrode chamber 120*a* of the first redox flow charging cell 110A and the positive electrode chamber 120*a* of the third redox flow charging cell 110C. The pipe 50*a*5 feeds the positive electrode electrolyte PL to the positive electrode chamber 120*a* of the first redox flow charging cell 110A and the positive electrode chamber 120*a* of the third redox flow charging cell 110C. The pipe 50*a*6 retrieves the positive electrode electrolyte PL from the positive electrode chamber 120*a* of the first redox flow charging cell 110A and the positive electrode chamber 120*a* of the third redox flow charging cell 110C. To the pipe 50*a*5 before the branching, the positive electrode pump 222*a* is installed. To each of branches of the pipe 50*a*5, an electromagnetic valve 230 is installed. In addition, to each of branches of the pipe 50*a*6, an electromagnetic valve 230 is installed.

The pipes 50*a*7 and 50*a*8 connect the positive electrode electrolyte storage tank 210*a* of the first common storage 300A to the positive electrode chamber 120*a* of the fourth redox flow discharging cell 410D. The pipe 50*a*7 feeds the positive electrode electrolyte PL to the positive electrode chamber 120*a* of the fourth redox flow discharging cell 410D. The pipe 50*a*8 retrieves the positive electrode electrolyte PL from the positive electrode chamber 120*a* of the fourth redox flow discharging cell 410D. To the pipe 50*a*7, the positive electrode pump 224*a* is installed.

Each of the pipes 50*c*5 and 50*c*6 branches and connects the negative electrode electrolyte storage tank 210*c* of the first common storage 300A to each of the negative electrode chamber 120*c* of the first redox flow charging cell 110A and the negative electrode chamber 120*c* of the third redox flow charging cell 110C. The pipe 50*c*5 feeds the negative electrode electrolyte NL to the negative electrode chamber 120*c* of the first redox flow charging cell 110A and the negative electrode chamber 120*c* of the third redox flow charging cell 110C. The pipe 50*c*6 retrieves the negative electrode electrolyte NL from the negative electrode chamber 120*c* of the first redox flow charging cell 110A and the negative electrode chamber 120*c* of the third redox flow charging cell 110C. To the pipe 50*c*5 before the branching, the negative electrode pump 222*c* is installed. To each of branches of the pipe 50*c*5, an electromagnetic valve 230 is installed. In addition, to each of branches of the pipe 50*c*6, an electromagnetic valve 230 is installed.

The pipes 50*c*7 and 50*c*8 connect the negative electrode electrolyte storage tank 210*c* of the first common storage 300A to the negative electrode chamber 120*c* of the fourth redox flow discharging cell 410D. The pipe 50*c*7 feeds the negative electrode electrolyte NL to the negative electrode chamber 120*c* of the fourth redox flow discharging cell 410D. The pipe 50*c*8 retrieves the negative electrode electrolyte NL from the negative electrode chamber 120*c* of the fourth redox flow discharging cell 410D. To the pipe 50*c*7, the negative electrode pump 224*c* is installed.

The positive electrode electrolyte storage tank 210*a* of the first common storage 300A stores the positive electrode electrolyte PL that are charged by the first redox flow charger 100A and the third redox flow charger 100C. The positive electrode electrolyte PL stored in the positive electrode electrolyte storage tank 210*a* of the first common storage 300A circulates, via the pipes 50, in the positive electrode chamber 120*a* of the first redox flow charging cell 110A, the positive electrode chamber 120*a* of the third redox flow charging cell 110C, and the positive electrode chamber 120*a* of the fourth redox flow discharging cell 410D.

The positive electrode pump 222*a* of the first common storage 300A is installed to the pipe 50*a*5. The positive electrode pump 222*a* of the first common storage 300A circulates the positive electrode electrolyte PL to the positive electrode chamber 120*a* of the first redox flow charging cell 110A or the positive electrode chamber 120*a* of the third redox flow charging cell 110C. The positive electrode pump 222*a* of the first common storage 300A, under the control of the controller 500, controls a flow rate of the positive electrode electrolyte PL that circulates in the positive electrode chamber 120*a* of the first redox flow charging cell 110A or the positive electrode chamber 120*a* of the third redox flow charging cell 110C.

The positive electrode pump 224*a* of the first common storage 300A is installed to the pipe 50*a*7. The positive electrode pump 224*a* of the first common storage 300A circulates the positive electrode electrolyte PL to the positive electrode chamber 120*a* of the fourth redox flow discharging cell 410D. The positive electrode pump 224*a* of the first common storage 300A, under the control of the controller 500, controls a flow rate of the positive electrode electrolyte PL that circulates in the positive electrode chamber 120*a* of the fourth redox flow discharging cell 410D.

The negative electrode electrolyte storage tank 210*c* of the first common storage 300A stores the negative electrode electrolyte NL that is charged by the first redox flow charger 100A and the third redox flow charger 100C. The negative electrode electrolyte NL stored in the negative electrode electrolyte storage tank 210*c* of the first common storage 300A circulates, via the pipes 50, in the negative electrode chamber 120*c* of the first redox flow charging cell 110A, the negative electrode chamber 120*c* of the third redox flow charging cell 110C, and the negative electrode chamber 120*c* of the fourth redox flow discharging cell 410D.

The negative electrode pump 222*c* of the first common storage 300A is installed to the pipe 50*c*5. The negative electrode pump 222*c* of the first common storage 300A circulates the negative electrode electrolyte NL to the negative electrode chamber 120*c* of the first redox flow charging cell 110A or the negative electrode chamber 120*c* of the third redox flow charging cell 110C. The negative electrode pump 222*c* of the first common storage 300A, under the control of the controller 500, controls a flow rate of the negative electrode electrolyte NL that circulates in the negative electrode chamber 120*c* of the first redox flow charging cell 110A or the negative electrode chamber 120*c* of the third redox flow charging cell 110C.

The negative electrode pump 224*c* of the first common storage 300A is installed to the pipe 50*c*7. The negative electrode pump 224*c* of the first common storage 300A circulates the negative electrode electrolyte NL to the negative electrode chamber 120*c* of the fourth redox flow discharging cell 410D. The negative electrode pump 224*c* of the first common storage 300A, under the control of the controller 500, controls a flow rate of the negative electrode electrolyte NL that circulates in the negative electrode chamber 120*c* of the fourth redox flow discharging cell 410D.

The electromagnetic valves 230 of the first common storage 300A are installed to each of branches of the pipe 50*a*5, each of branches of the pipe 50*a*6, each of branches of the pipe 50*c*5, and each of branches of the pipe 50*c*6. The electromagnetic valves 230 of the first common storage 300A, under the control of the controller 500, open and close the pipes 50 (the branches of the pipe 50*a*5, the branches of the pipe 50*a*6, the branches of the pipe 50*c*5, and the branches of the pipe 50*c*6) that connect the positive electrode electrolyte storage tank 210*a* and the negative electrode electrolyte storage tank 210*c* of the first common storage 300A to the first redox flow charging cell 110A (the positive electrode chamber 120*a* and the negative electrode chamber 120*c*) and the third redox flow charging cell 110C (the positive electrode chamber 120*a* and the negative electrode chamber 120*c*), respectively.

Specifically, when the electrolytes that are to be charged by the first redox flow charging cell 110A are switched from the electrolytes in the first individual storage 200A to the electrolytes in the first common storage 300A, the electromagnetic valves 230 of the first common storage 300A open the pipes 50 that connect the positive electrode electrolyte storage tank 210*a* and the negative electrode electrolyte storage tank 210*c* of the first common storage 300A to the first redox flow charging cell 110A. When the electrolytes that are to be charged by the first redox flow charging cell 110A are switched from the electrolytes in the first common storage 300A to the electrolytes in the first individual storage 200A, the electromagnetic valves 230 of the first common storage 300A close the pipes 50 that connect the positive electrode electrolyte storage tank 210*a* and the negative electrode electrolyte storage tank 210*c* of the first common storage 300A to the first redox flow charging cell 110A.

When the electrolytes that are to be charged by the third redox flow charging cell 110C are switched between the electrolytes in the third individual storage 200C and the electrolytes in the first common storage 300A, the operation is the same as that in the above-described case where the electrolytes that are to be charged by the first redox flow charging cell 110A are switched between the electrolytes in the first individual storage 200A and the electrolytes in the first common storage 300A.

(Redox Flow Discharger)

(First Redox Flow Discharger)

The first redox flow discharger 400A discharges power with which the electrolytes in the first individual storage 200A are charged and supplies a power consumer with the power. The power consumer supplied with power by the first redox flow discharger 400A is, for example, a power consumer requesting power supply 100% based on renewable energy (RE100), a feed-in tariff (FIT) market, or the like. Since the power discharged from the first redox flow discharger 400A is power discharged from the electrolytes in the first individual storage 200A that is charged by the power source type A, which is an on-site renewable energy power source, the redox flow battery system 10 is capable of supplying a power consumer with power to which coloring entirely specifying on-site renewable energy is applied.

The first redox flow discharger 400A includes, as illustrated in FIG. 1, the first redox flow discharging cell 410A, a power meter 180, and a power conditioner PCS.

The first redox flow discharging cell 410A discharges power with which the electrolytes in the first individual storage 200A are charged. In the first redox flow discharging cell 410A, the electrolytes in the first individual storage 200A circulates via the pipes 50 connected to the first individual storage 200A. The first redox flow discharging cell 410A includes a positive electrode 115*a*, a positive electrode chamber 120*a*, a negative electrode 115*c*, a negative electrode chamber 120*c*, and a membrane 130. A configuration of the first redox flow discharging cell 410A is the same as that of the first redox flow charging cell 110A. On the positive electrode 115*a* of the first redox flow discharging cell 410A, pentavalent vanadium ions in the positive electrode electrolyte PL are reduced to tetravalent vanadium ions. In the negative electrode chamber 120*c* of the first redox flow discharging cell 410A, bivalent vanadium ions in the negative electrode electrolyte NL are oxidized to trivalent vanadium ions.

The power meter 180 of the first redox flow discharger 400A measures the amount of power discharged from the first redox flow discharging cell 410A. The power meter 180 of the first redox flow discharger 400A transmits a measured value of the amount of power to the controller 500.

The power conditioner PCS of the first redox flow discharger 400A controls discharge performed by the first redox flow discharging cell 410A, based on an instruction from the controller 500.

(Second Redox Flow Discharger)

The second redox flow discharger 400B discharges power with which the electrolytes in the second individual storage 200B are charged and supplies a power consumer with the power. The power consumer supplied with power by the second redox flow discharger 400B is, for example, a facility using power based on renewable energy as main power (hereinafter, referred to as a power consuming facility). The second redox flow discharger 400B is installed in the power consuming facility. To the power consuming facility, for example, power from a power system is also supplied. Since the power discharged from the second redox flow discharger 400B is power discharged from the electrolytes in the second individual storage 200B that are charged with power from the power source type B, which is an off-site renewable energy power source, the redox flow battery system 10 is capable of supplying a power consuming facility with power to which coloring entirely specifying off-site renewable energy is applied. Further, since the redox flow battery system 10 supplies a power consuming facility with power through charged electrolytes while being electrically insulated, asynchronous coordination can be achieved in a power consuming facility that is supplied with power from the power system while preventing infiltration of the power.

The second redox flow discharger 400B includes, as illustrated in FIG. 1, a second redox flow discharging cell 410B, a power meter 180, and a power conditioner PCS.

The second redox flow discharging cell 410B discharges power with which the electrolytes in the second individual storage 200B are charged. In the second redox flow discharging cell 410B, the electrolytes in the second individual storage 200B circulate via the pipes 50 connected to the second individual storage 200B. The second redox flow discharging cell 410B includes a positive electrode 115*a*, a positive electrode chamber 120*a*, a negative electrode 115*c*, a negative electrode chamber 120*c*, and a membrane 130. A configuration of the second redox flow discharging cell 410B is the same as that of the first redox flow charging cell 110A.

The power meter 180 of the second redox flow discharger 400B measures the amount of power discharged from the second redox flow discharging cell 410B. The power meter 180 of the second redox flow discharger 400B transmits a measured value of the amount of power to the controller 500.

The power conditioner PCS of the second redox flow discharger 400B controls discharge performed by the second redox flow discharging cell 410B, based on an instruction from the controller 500.

(Third Redox Flow Discharger)

The third redox flow discharger 400C discharges power with which the electrolytes in the third individual storage 200C are charged and supplies a power consumer with the power. The power consumer supplied with the power by the third redox flow discharger 400C is, for example, an electricity retailer. Since the power discharged from the third redox flow discharger 400C is power discharged from the electrolytes in the third individual storage 200C that is charged with power from the power source type C, the redox flow battery system 10 is capable of supplying a power consumer with power to which coloring is applied.

The third redox flow discharger 400C includes, as illustrated in FIG. 1, a third redox flow discharging cell 410C, a power meter 180, and a power conditioner PCS.

The third redox flow discharging cell 410C discharges power with which the electrolytes in the third individual storage 200C are charged. In the third redox flow discharging cell 410C, the electrolytes in the third individual storage 200C circulate via the pipes 50 connected to the third individual storage 200C. The third redox flow discharging cell 410C includes a positive electrode 115*a*, a positive electrode chamber 120*a*, a negative electrode 115*c*, a negative electrode chamber 120*c*, and a membrane 130. A configuration of the third redox flow discharging cell 410C is the same as that of the first redox flow charging cell 110A.

The power meter 180 of the third redox flow discharger 400C measures the amount of power discharged from the third redox flow discharging cell 410C. The power meter 180 of the third redox flow discharger 400C transmits a measured value of the amount of power to the controller 500.

The power conditioner PCS of the third redox flow discharger 400C controls discharge performed by the third redox flow discharging cell 410C, based on an instruction from the controller 500.

(Fourth Redox Flow Discharger)

The fourth redox flow discharger 400D discharges power with which the electrolytes in the first common storage 300A are charged and supplies a power consumer with the power. The power consumer supplied with the power by the fourth redox flow discharger 400D is, for example, a power consumer, an electricity retailer, or the like that does not have a preference for a specific power source type. Since the power with which the electrolytes in the first common storage 300A are charged is power from the power source type A (for example, surplus on-site renewable energy power) or the power source type C (for example, power procured from the wholesale power market when a price of power is low), inexpensive power can be supplied to a power consumer.

The fourth redox flow discharger 400D includes, as illustrated in FIG. 1, the fourth redox flow discharging cell 410D, a power meter 180, and a power conditioner PCS.

The fourth redox flow discharging cell 410D discharges power with which the electrolytes in the first common storage 300A are charged. In the fourth redox flow discharging cell 410D, the electrolytes in the first common storage 300A circulate via the pipes 50 connected to the first common storage 300A. The fourth redox flow discharging cell 410D includes a positive electrode 115*a*, a positive electrode chamber 120*a*, a negative electrode 115*c*, a negative electrode chamber 120*c*, and a membrane 130. A configuration of the fourth redox flow discharging cell 410D is the same as that of the first redox flow charging cell 110A.

The power meter 180 of the fourth redox flow discharger 400D measures the amount of power discharged from the fourth redox flow discharging cell 410D. The power meter 180 of the fourth redox flow discharger 400D transmits a measured value of the amount of power to the controller 500.

The power conditioner PCS of the fourth redox flow discharger 400D controls discharge performed by the fourth redox flow discharging cell 410D, based on an instruction from the controller 500.

(Controller)

The controller 500 calculates charging depth of the electrolytes in each of the first to third individual storages 200A to 200C and the first common storage 300A from values of open circuit voltages measured by the open circuit voltage measurers 240 of the first to third individual storages 200A to 200C and the first common storage 300A. The controller 500 controls each unit, based on the calculated charging depth, a preset condition, an instruction from the outside, and the like.

First, control of charging of the electrolytes in the first to third individual storages 200A to 200C and the first common storage 300A (charging by the first to third redox flow chargers 100A to 100C) is described.

(Charging of First Individual Storage)

When the charging depth of the electrolytes in the first individual storage 200A is less than a predetermined first threshold value (for example, 80%), the controller 500 controls the first redox flow charger 100A and the first individual storage 200A to circulate the electrolytes in the first individual storage 200A to the first redox flow charger 100A, which is connected to the power source type A (on-site renewable energy power source), and charge the electrolytes in the first individual storage 200A with power from the power source type A.

When the charging depth of the electrolytes in the first individual storage 200A is greater than or equal to the predetermined first threshold value, the controller 500 controls the first redox flow charger 100A, the first individual storage 200A, and the first common storage 300A to switch the electrolytes that the first redox flow charger 100A charges from the electrolytes in the first individual storage 200A to the electrolytes in the first common storage 300A. Further, when the charging depth of the electrolytes in the first individual storage 200A is less than or equal to a second threshold value (for example, 70%) that is less than the predetermined first threshold value, the controller 500 controls the first redox flow charger 100A, the first individual storage 200A, and the first common storage 300A to switch the electrolytes that the first redox flow charger 100A charges from the electrolytes in the first common storage 300A to the electrolytes in the first individual storage 200A and charge the electrolytes in the first individual storage 200A with power from the power source type A.

In the present embodiment, when the charging depth of the electrolytes in the first individual storage 200A is greater than or equal to the predetermined first threshold value, the electrolytes that the first redox flow charger 100A charges is switched from the electrolytes in the first individual storage 200A to the electrolytes in the first common storage 300A and charging of the electrolytes in the first individual storage 200A is suspended. Because of this configuration, surplus power from the power source type A (on-site renewable energy power source) that is connected to the first redox flow charger 100A can be effectively utilized.

(Charging of Second Individual Storage)

The controller 500 controls the second redox flow charger 100B and the second individual storage 200B to charge the electrolytes in the second individual storage 200B with power of an amount necessary for discharge (discharge from the second redox flow discharger 400B) from the power source type B.

(Charging of Third Individual Storage)

When the price of power with which charging is performed from the power source type C connected to the third redox flow charger 100C (the price of power procured from the wholesale power market) is less expensive than the predetermined first price and the charging depth of the electrolytes in the third individual storage 200C is less than the predetermined first threshold value (for example, 80%), the controller 500 controls the third redox flow charger 100C and the third individual storage 200C to charge the electrolytes in the third individual storage 200C with power from the power source type C.

When the price of power with which charging is performed from the power source type C is less expensive than the predetermined first price and the charging depth of the electrolytes in the third individual storage 200C is greater than or equal to the predetermined first threshold value, the controller 500 controls the third redox flow charger 100C, the third individual storage 200C, and the first common storage 300A to switch the electrolytes that the third redox flow charger 100C charges from the electrolytes in the third individual storage 200C to the electrolytes in the first common storage 300A. When the price of power with which charging is performed from the power source type C is less expensive than the predetermined first price and the charging depth of the electrolytes in the third individual storage 200C is less than or equal to the predetermined second threshold value (for example, 70%), the controller 500 controls the third redox flow charger 100C, the third individual storage 200C, and the first common storage 300A to switch the electrolytes that the third redox flow charger 100C charges from the electrolytes in the first common storage 300A to the electrolytes in the third individual storage 200C and charge the electrolytes in the third individual storage 200C with power from the power source type C. In the present embodiment, when the price of power with which charging is performed from the power source type C is performed is greater than or equal to the predetermined first price, the electrolytes in the third individual storage 200C are not charged. Therefore, power can be provided at an inexpensive price.

(Charging of First Common Storage)

When the charging depth of the electrolytes in the first individual storage 200A is greater than or equal to the predetermined first threshold value, the controller 500 controls the first redox flow charger 100A, the first individual storage 200A, and the first common storage 300A to switch the electrolytes that the first redox flow charger 100A charges from the electrolytes in the first individual storage 200A to the electrolytes in the first common storage 300A and charge the electrolytes in the first common storage 300A with power from the power source type A. Therefore, surplus power from the power source type A (on-site renewable energy power source) that is connected to the first redox flow charger 100A can be effectively utilized.

In addition, when the price of power with which charging is performed from the power source type C is less expensive than the predetermined first price and the charging depth of the electrolytes in the third individual storage 200C is greater than or equal to the predetermined first threshold value, the controller 500 controls the first redox flow charger 100A, the third individual storage 200C, and the first common storage 300A to switch the electrolytes that the third redox flow charger 100C charges from the electrolytes in the third individual storage 200C to the electrolytes in the first common storage 300A and charge the electrolytes in the first common storage 300A with power from the power source type C. Because of this configuration, surplus power can be effectively utilized and power can be provided at an inexpensive price as well.

(Discharge)

Control of discharge from the electrolytes in the first to third individual storages 200A to 200C and the first common storage 300A (discharge by the first to fourth redox flow dischargers 400A to 400D) is described.

The controller 500 controls the first redox flow discharger 400A and the first individual storage 200A to discharge power with which the electrolytes in the first individual storage 200A are charged from the first redox flow discharger 400A continuously at a predetermined output level. In addition, the controller 500 also causes power with which the electrolytes in the second individual storage 200B are charged to be discharged from the second redox flow discharger 400B, as with the electrolytes in the first individual storage 200A.

The controller 500 controls the third redox flow discharger 400C and the third individual storage 200C to discharge power with which the electrolytes in the third individual storage 200C are charged from the third redox flow discharger 400C when, for example, the price of power is greater than or equal to a predetermined second price that is more expensive than the predetermined first price. In addition, the controller 500 also causes power with which the electrolytes in the first common storage 300A are charged to be discharged from the fourth redox flow discharger 400D, as with the electrolytes in the third individual storage 200C.

Figure 5:
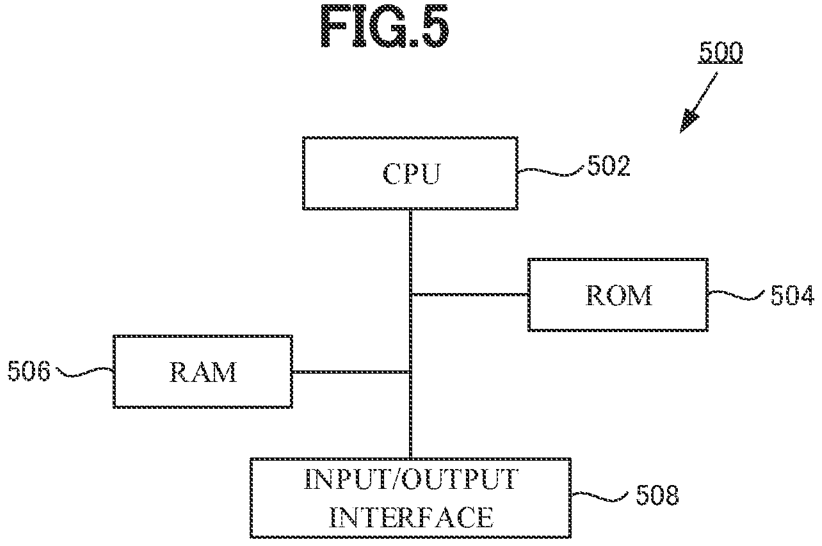
FIG. 5 is a diagram illustrating a hardware configuration of a controller according to Embodiment 1.

FIG. 5 illustrates a hardware configuration of the controller 500. The controller 500 includes a central processing unit (CPU) 502, a read only memory (ROM) 504, a random access memory (RAM) 506, and an input/output interface 508. The CPU 502 executes programs stored in the ROM 504. The ROM 504 stores programs, data, and the like. The RAM 506 stores data. The input/output interface 508 inputs and outputs signals among the respective units. Functions of the controller 500 are achieved by the CPU 502 executing the programs.

Figure 6:
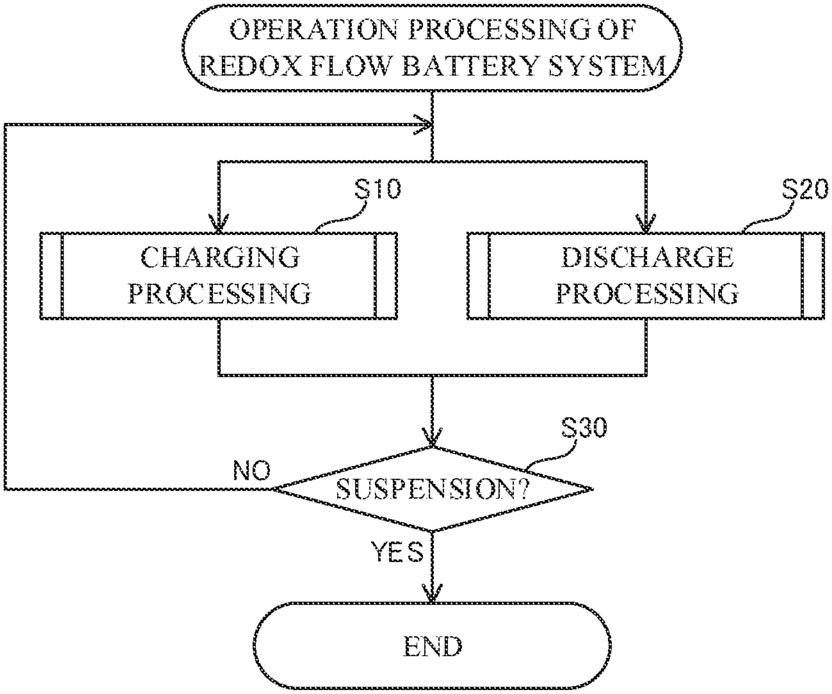
FIG. 6 is a flowchart illustrating operation processing of the redox flow battery system according to Embodiment 1.

Next, operation processing of the redox flow battery system 10 is described with reference to FIGS. 6 to 8. In the operation processing of the redox flow battery system 10, charging processing (step S10) and discharge processing (step S20) are performed, as illustrated in FIG. 6. The charging processing (step S10) and the discharge processing (step S20) are executed in parallel, and when no operation suspension instruction is input to the controller 500 (step S30; NO), the operation of the redox flow battery system 10 returns to the charging processing (step S10) and the discharge processing (step S20). When an operation suspension instruction is input to the controller 500 (step S30; YES), the operation of the redox flow battery system 10 terminates.

Figure 7:
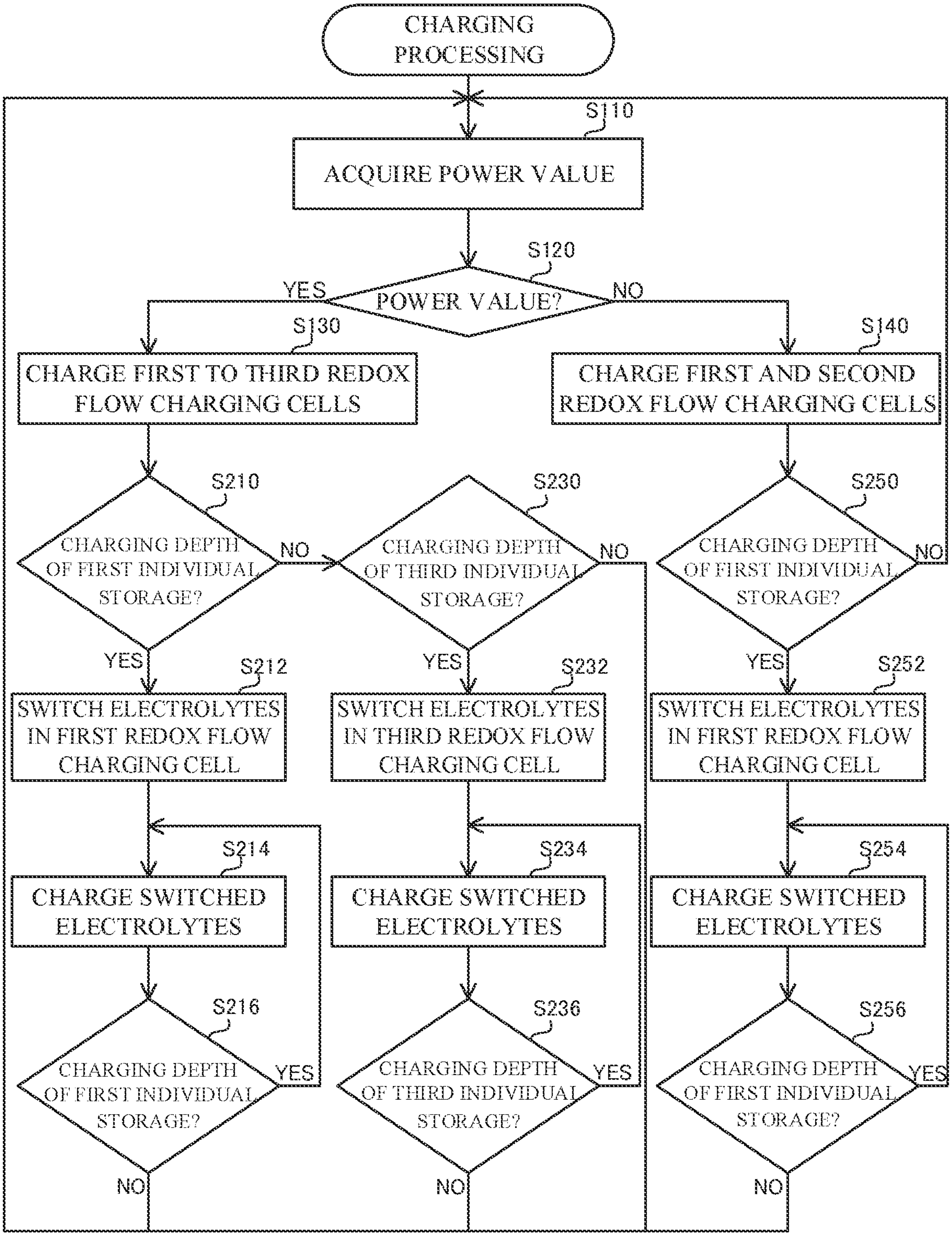
FIG. 7 is a flowchart illustrating charging processing according to Embodiment 1.

With reference to FIG. 7, the charging processing (step S10) is described. When the charging processing is started, the controller 500 selects a redox flow charging cell that performs charging, based on a power value (a price of power, an environmental value, a wheeling charge, and the like). Herein, description is made assuming that the power value is represented by the price of power. First, the controller 500 acquires a power value (price of power) from the outside (step S110). The controller 500 selects a redox flow charging cell that performs charging, based on the power value (step S120). Specifically, when the power value is less expensive than a predetermined first price (step S120; YES), the controller 500 selects the first to third redox flow charging cells 110A to 110C as redox flow charging cells that perform charging. When the power value is greater than or equal to the predetermined first price (step S120; NO), the controller 500, by excluding the third redox flow charging cell 110C that is connected to the power source type C, which procures power from the wholesale power market, selects the first redox flow charging cell 110A and the second redox flow charging cell 110B as redox flow charging cells that perform charging.

When the power value is less expensive than the predetermined first price (step S120; YES), the controller 500 charges electrolytes with power by the first to third redox flow charging cells 110A to 110C (step S130). Specifically, the controller 500 circulates the electrolytes in the first individual storage 200A to the first redox flow charging cell 110A, which is connected to the power source type A (on-site renewable energy power source) and performs charging with power from the power source type A, and causes the first redox flow charging cell 110A to charge the electrolytes in the first individual storage 200A with power only from the power source type A. In addition, the controller 500 circulates the electrolytes in the second individual storage 200B to the second redox flow charging cell 110B, which is connected to the power source type B (off-site renewable energy power source) and performs charging with power from the power source type B, and causes the second redox flow charging cell 110B to charge the electrolytes in the second individual storage 200B with power only from the power source type B. Further, the controller 500 circulates the electrolytes in the third individual storage 200C to the third redox flow charging cell 110C, which is connected to the power source type C (power procured from the wholesale power market) and performs charging with power from the power source type C, and causes the third redox flow charging cell 110C to charge the electrolytes in the third individual storage 200C with power only from the power source type C. Each of the first to third individual storages 200A to 200C stores electrolytes that are charged only by a corresponding one of the first to third redox flow chargers 100A to 100C. Therefore, in each of the first to third individual storages 200A to 200C, electrolytes to which coloring specifying one of the power source types A to C is applied are stored.

Note that the controller 500 calculates charging depth of the electrolytes in each of the first to third individual storages 200A to 200C and the first common storage 300A from values of open circuit voltages measured by the open circuit voltage measurers 240. The controller 500 monitors the depth of charge of the electrolytes in each of the first to third individual storages 200A to 200C and the first common storage 300A.

Next, the controller 500 determines the charging depth of the electrolytes in the first individual storage 200A (step S210). Specifically, when the charging depth of the electrolytes in the first individual storage 200A is greater than or equal to a predetermined first threshold value (for example, 80%) (step S210; YES), the controller 500 switches electrolytes that circulate in the first redox flow charging cell 110A from the electrolytes in the first individual storage 200A to the electrolytes in the first common storage 300A, which stores electrolytes charged by the first redox flow charging cell 110A and the third redox flow charging cell 110C (step S212). The controller 500 charges the switched electrolytes in the first common storage 300A with power from the power source type A by the first redox flow charging cell 110A (step S214). The controller 500 determines the charging depth of the electrolytes in the first individual storage 200A again (step S216) and when the charging depth of the electrolytes in the first individual storage 200A is greater than a predetermined second threshold value (for example, 70%) that is less than the predetermined first threshold value (step S216; YES), returns to step S214. When the charging depth of the electrolytes in the first individual storage 200A is less than or equal to the predetermined second threshold value (step S216; NO), the controller 500 returns to step S110. Note that in step S212, circulation of the electrolytes from the first individual storage 200A to the first redox flow charging cell 110A is suspended.

In the present embodiment, when the charging depth of the electrolytes in the first individual storage 200A is greater than or equal to the predetermined first threshold value, the electrolytes that circulate in the first redox flow charging cell 110A is switched from the electrolytes in the first individual storage 200A to the electrolytes in the first common storage 300A. Because of this configuration, surplus power from the power source type A (on-site renewable energy power source) can be effectively utilized. In addition, development of a precipitate from the electrolytes can be suppressed.

When the charging depth of the electrolytes in the first individual storage 200A is less than the predetermined first threshold value (step S210; NO), the controller 500 determines the charging depth of the electrolytes in the third individual storage 200C (step S230). Specifically, when the charging depth of the electrolytes in the third individual storage 200C is greater than or equal to the predetermined first threshold value (step S230; YES), the controller 500 switches electrolytes that circulate in the third redox flow charging cell 110C from the electrolytes in the third individual storage 200C to the electrolytes in the first common storage 300A (step S232). The controller 500 charges the switched electrolytes in the first common storage 300A with power from the power source type C by the third redox flow charging cell 110C (step S234). The controller 500 determines the charging depth of the electrolytes in the third individual storage 200C again (step S236) and when the charging depth of the electrolytes in the third individual storage 200C is greater than the predetermined second threshold value (step S236; YES), returns to step S234. When the charging depth of the electrolytes in the third individual storage 200C is less than or equal to the predetermined second threshold value (step S236; NO), the controller 500 returns to step S110.

When the charging depth of the electrolytes in the third individual storage 200C is less than the predetermined first threshold value (step S230; NO), the controller 500 returns to step S110. Note that in step S232, circulation of the electrolytes from the third individual storage 200C to the third redox flow charging cell 110C is suspended.

In the present embodiment, when the charging depth of the electrolytes in the third individual storage 200C is greater than or equal to the predetermined first threshold value, the electrolytes that circulate in the third redox flow charging cell 110C is switched from the electrolytes in the third individual storage 200C to the electrolytes in the first common storage 300A. Because of this configuration, surplus power from the power source type C (wholesale power market) can be effectively utilized. In addition, development of a precipitate from the electrolytes can be suppressed. Further, since the charging is performed when the power value is less expensive than the predetermined first price, power can be provided at an inexpensive price.

On the other hand, when the power value is greater than or equal to the predetermined first price (step S120; NO), the controller 500 charges the electrolytes with power by the first redox flow charging cell 110A and the second redox flow charging cell 110B (step S140). Specifically, the controller 500 circulates the electrolytes in the first individual storage 200A to the first redox flow charging cell 110A and causes the first redox flow charging cell 110A to charge the electrolytes in the first individual storage 200A with power from the power source type A. In addition, the controller 500 circulates the electrolytes in the second individual storage 200B to the second redox flow charging cell 110B and causes the second redox flow charging cell 110B to charge the electrolytes in the second individual storage 200B with power from the power source type B.

Next, the controller 500 determines the charging depth of the electrolytes in the first individual storage 200A (step S250). Specifically, when the charging depth of the electrolytes in the first individual storage 200A is greater than or equal to the predetermined first threshold value (step S250; YES), the controller 500 switches the electrolytes that circulate in the first redox flow charging cell 110A from the electrolytes in the first individual storage 200A to the electrolytes in the first common storage 300A (step S252). The controller 500 charges the switched electrolytes in the first common storage 300A with power from the power source type A by the first redox flow charging cell 110A (step S254). The controller 500 determines the charging depth of the electrolytes in the first individual storage 200A again (step S256) and when the charging depth of the electrolytes in the first individual storage 200A is greater than the predetermined second threshold value (step S256; YES), returns to step S254. When the charging depth of the electrolytes in the first individual storage 200A is less than or equal to the predetermined second threshold value (step S256; NO), the controller 500 returns to step S110. When the charging depth of the electrolytes in the first individual storage 200A is less than the predetermined first threshold value (step S250; NO), the controller 500 returns to step S110.

Figure 8:
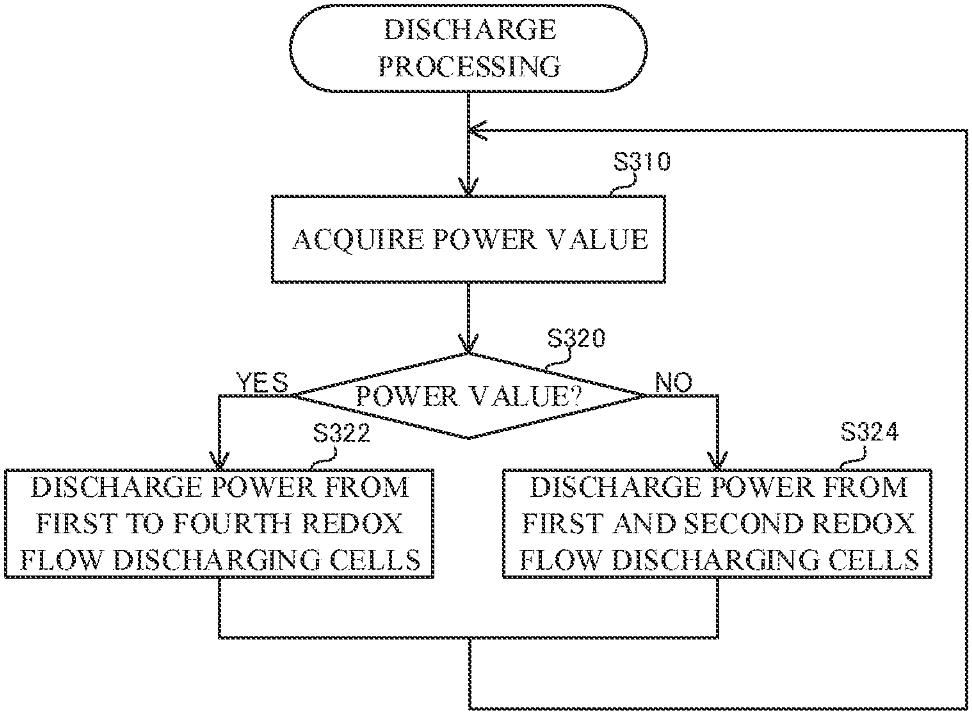
FIG. 8 is a flowchart illustrating discharge processing according to Embodiment 1.

Next, with reference to FIG. 8, the discharge processing (step S20) is described. When the discharge processing is started, the controller 500 acquires the power value (price of power) from the outside (step S310). The controller 500 selects a redox flow discharging cell that performs discharge, based on the power value (step S320). Specifically, when the power value is greater than or equal to a predetermined second price that is more expensive than the predetermined first price (step S320; YES), the controller 500 selects the first to fourth redox flow discharging cells 410A to 410D as redox flow discharging cells that perform discharge. When the power value is less expensive than the second price (step S320; NO), the controller 500 selects the first redox flow discharging cell 410A and the second redox flow discharging cell 410B as redox flow discharging cells that perform discharge.

When the power value is greater than or equal to the predetermined second price that is more expensive than the predetermined first price (step S320; YES), the controller 500 circulates the electrolytes in each of the first to third individual storages 200A to 200C and the first common storage 300A to a corresponding one of the first to fourth redox flow discharging cells 410A to 410D and causes the first to fourth redox flow discharging cells 410A to 410D to discharge power (step S322). After a predetermined time has elapsed, the controller 500 returns to step S310.

When the power value is less expensive than the predetermined second price (step S320; NO), the controller 500 circulates the electrolytes in each of the first individual storage 200A and the second individual storage 200B to a corresponding one of the first redox flow discharging cell 410A and the second redox flow discharging cell 410B and causes the first redox flow discharging cell 410A and the second redox flow discharging cell 410B to discharge power (step S324). After a predetermined time has elapsed, the controller 500 returns to step S310.

In the present embodiment, power with which the electrolytes in each of the first to third individual storages 200A to 200C and the first common storage 300A are charged is discharged from one of the first to fourth redox flow dischargers 410A to 410D. Since coloring is applied to the electrolytes in the first to third individual storages 200A to 200C and the first common storage 300A, based on power source types, power to which coloring is applied can be supplied to a power consumer from each of the first to fourth redox flow discharging cells 410A to 410D.

As described in the foregoing, since each of the first to third redox flow charging cells 110A to 110C charges electrolytes with power from a predetermined power source type and electrolytes that circulate in each of the first to third redox flow charging cells 110A to 110C and are charged with power from a predetermined power source type are stored in one of the first to third individual storages 200A to 200C, the redox flow battery system 10 is capable of supplying power consumers with power to which coloring is applied. In addition, since the electrolytes that circulate in the first redox flow charging cell 110A are switched from the electrolytes in the first individual storage 200A to the electrolytes in the first common storage 300A, based on the charging depth of the electrolytes in the first individual storage 200A, the electrolytes in the first common storage 300A can be charged with surplus power from the power source type A that is connected to the first redox flow charging cell 110A and surplus power from the power source type A can be effectively utilized. In addition, as with the surplus power from the power source type A, the electrolytes in the first common storage 300A can also be charged with surplus power from the power source type C that is connected to the third redox flow charging cell 110C, the surplus power from the power source type C can be effectively utilized.

Embodiment 2

A redox flow battery system 10 may include a second common storage 300B in place of the first common storage 300A.

Figure 9:
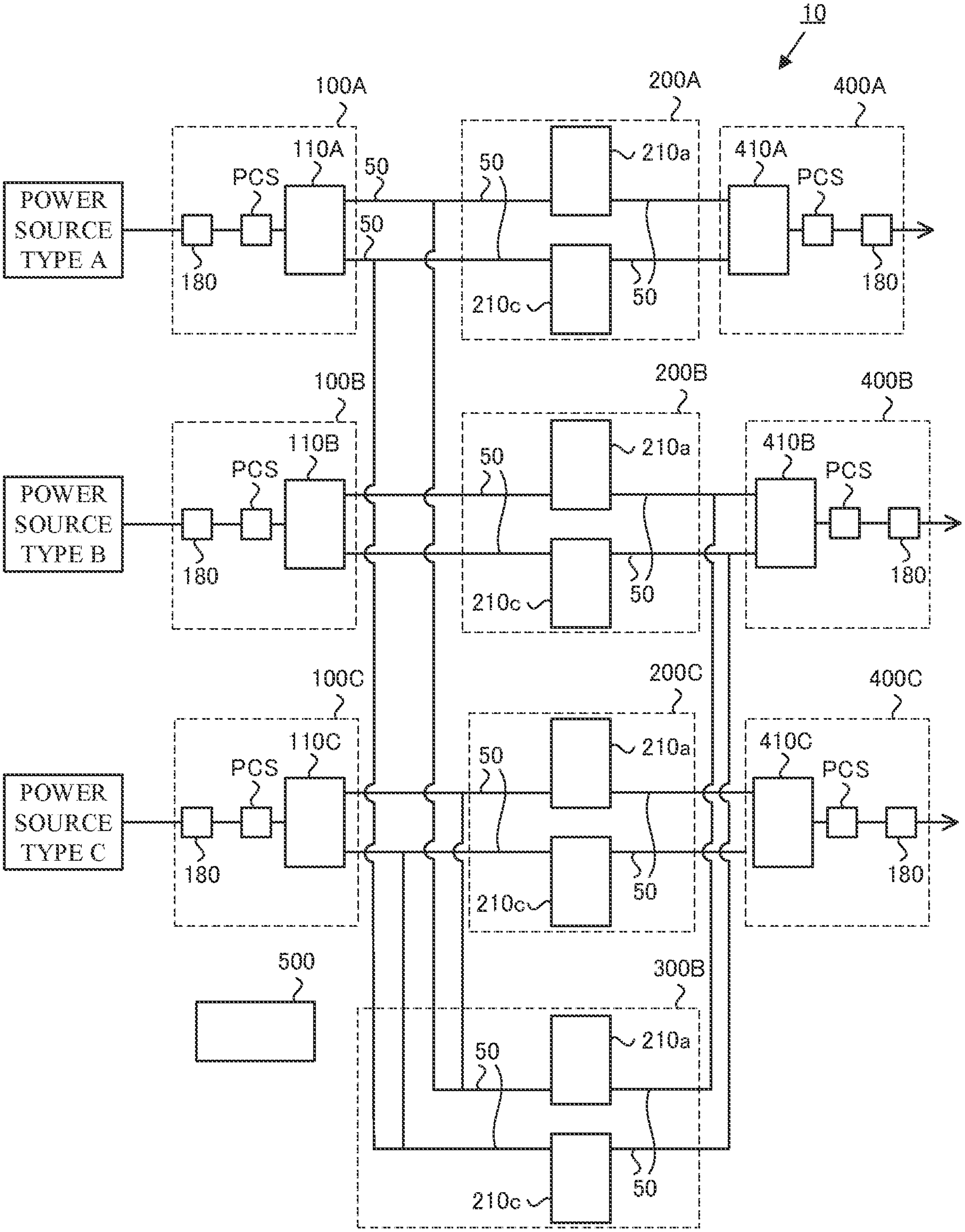
FIG. 9 is a schematic diagram of a redox flow battery system according to Embodiment 2.

The redox flow battery system 10 of the present embodiment includes, as illustrated in FIG. 9, first to third redox flow chargers 100A to 100C, first to third individual storages 200A to 200C, the second common storage 300B, first to third redox flow dischargers 400A to 400C, and a controller 500. In the present embodiment, since a configuration of the redox flow battery system 10 is the same as the configuration of the redox flow battery system 10 in Embodiment 1 except for the second individual storage 200B, the second common storage 300B, the second redox flow discharger 400B, and the controller 500, the second individual storage 200B, the second common storage 300B, the second redox flow discharger 400B, and the controller 500 are described. Note that in FIG. 9, to facilitate understanding, some of the components are omitted or simplified.

The second common storage 300B stores electrolytes that are charged with power for a business continuity plan (BCP) at the time of a disaster, power outage, or the like. In normal times, the electrolytes in the second common storage 300B are charged by the first redox flow charger 100A and the third redox flow charger 100C and are kept in a state in which the electrolytes have a high charging depth (for example, 80%). In the present embodiment, at the time of a disaster, power outage, or the like, the electrolytes in the second common storage 300B are circulated to the second redox flow discharging cell 410B, and power for a business continuity plan is supplied from the second redox flow discharging cell 410B to a power consumer.

The second common storage 300B, as with the first common storage 300A, includes pipes 50, a positive electrode electrolyte storage tank 210*a*, positive electrode pumps 222*a* and 224*a*, a negative electrode electrolyte storage tank 210*c*, negative electrode pumps 222*c* and 224*c*, electromagnetic valves 230, and an open circuit voltage measurer 240. A configuration of a part of the second common storage 300B other than the pipes 50 is the same as the configuration of the first common storage 300A.

A configuration of pipes 50 that connect the positive electrode electrolyte storage tank 210*a* and the negative electrode electrolyte storage tank 210*c* of the second common storage 300B to the first redox flow charging cell 110A and the third redox flow charging cell 110C, respectively is the same as the pipes 50*a*5, 50*a*6, 50*c*5, and 50*c*6 of the first common storage 300A. To a pipe 50 that feeds a positive electrode electrolyte PL from the positive electrode electrolyte storage tank 210*a* of the second common storage 300B to a positive electrode chamber 120*a* of the second redox flow discharging cell 410B, the positive electrode pump 224*a* and an electromagnetic valve 230 are installed. To a pipe 50 that retrieves the positive electrode electrolyte PL from the positive electrode chamber 120*a* of the second redox flow discharging cell 410B to the positive electrode electrolyte storage tank 210*a* of the second common storage 300B, an electromagnetic valve 230 is installed. In addition, to a pipe 50 that feeds a negative electrode electrolyte NL from the negative electrode electrolyte storage tank 210*c* of the second common storage 300B to a negative electrode chamber 120*c* of the second redox flow discharging cell 410B, the negative electrode pump 224*c* and an electromagnetic valve 230 are installed. To a pipe 50 that retrieves the negative electrode electrolyte NL from the negative electrode chamber 120*c* of the second redox flow discharging cell 410B to the negative electrode electrolyte storage tank 210*c* of the second common storage 300B, an electromagnetic valve 230 is installed.

A configuration of the second individual storage 200B of the present embodiment is the same as the configuration of the second individual storage 200B in Embodiment 1 except that electromagnetic valves 230 are installed to pipes 50 that connect the second individual storage 200B to the second redox flow discharging cell 410B.

A configuration of the second redox flow discharger 400B of the present embodiment is the same as the configuration of the second redox flow discharger 400B in Embodiment 1 except that the electrolytes that are circulated are switched between electrolytes in the second individual storage 200B and electrolytes in the second common storage 300B.

At the time of a disaster, power outage, or the like, the controller 500 of the present embodiment switches, based on an instruction from the outside, the electrolytes that circulate in the second redox flow discharger 400B from the electrolytes in the second individual storage 200B to the electrolytes in the second common storage 300B, discharges power from the second redox flow discharger 400B, and supplies a power consumer with power for a business continuity plan.

In normal times, the controller 500 of the present embodiment monitors charging depth of the electrolytes in the second common storage 300B, switches the electrolytes that circulate in the first redox flow charger 100A or the third redox flow charger 100C as with Embodiment 1 in such a way that the electrolytes in the second common storage 300B maintain a high charging depth, and charges the electrolytes in the second common storage 300B with power from a power source type A and a power source type C. The other control performed by the controller 500 in the normal times is the same as the control in Embodiment 1.

As described above, the redox flow battery system 10 of the present embodiment is capable of supplying a power consumer with power for a business continuity plan. In addition, since the electrolytes in the second common storage 300B are, as with the electrolytes in the first common storage 300A, charged with surplus power from the power source type A and the power source type C, the redox flow battery system 10 of the present embodiment is capable of effectively utilizing surplus power. The redox flow battery system 10 of the present embodiment is, as with the redox flow battery system 10 in Embodiment 1, capable of supplying a power consumer with power to which coloring is applied.

Modified Examples

Although the embodiments are described above, the present disclosure can be subjected to various modifications without departing from the scope of the present disclosure.

For example, the active material in the positive electrode electrolyte PL and the negative electrode electrolyte NL is not limited to vanadium ions. The active materials in the positive electrode electrolyte PL and the negative electrode electrolyte NL may be iron ions and chromium ions, respectively.

The number of redox flow chargers, redox flow dischargers, redox flow charging cells, and the like in the redox flow battery system 10 can be set to arbitrary numbers.

Power source types connected to the first to third redox flow chargers 100A to 100C may be set to arbitrary power source types as long as the power source types are power sources to which coloring is applicable. The power source types may include geothermal power generation, wind power generation, a power system, or the like.

In addition, a threshold value for determining the charging depth of the electrolytes in the first individual storage 200A and a threshold value for determining the charging depth of the electrolytes in the third individual storage 200C may be different values.

In the redox flow battery system 10 of Embodiment 1, the electrolytes in a plurality of individual storages may be circulated to a plurality of redox flow dischargers and power with which the electrolytes are charged may be discharged from the plurality of redox flow dischargers. For example, since the power source types A and B are renewable energy power sources, by switching the electrolytes that circulate to the second redox flow discharger 400B between the electrolytes in the second individual storage 200B and the electrolytes in the first individual storage 200A, power with which the electrolytes in the first individual storage 200A are charged and power with which the electrolytes in the second individual storage 200B are charged may be discharged from the second redox flow discharger 400B.

In the redox flow battery system 10 of Embodiment 2, the electrolytes in the second common storage 300B may be circulated to a plurality of redox flow dischargers, and power for a business continuity plan may be discharged from the plurality of redox flow dischargers.

The redox flow battery system 10 of Embodiment 2 may have a configuration in which the positive electrode electrolyte storage tank 210*a* and the negative electrode electrolyte storage tank 210*c* of each of the first to third individual storages 200A to 200C can be connected to the positive electrode electrolyte storage tank 210*a* and the negative electrode electrolyte storage tank 210*c* of the second common storage 300B, respectively. When configured in this manner, the positive electrode electrolyte storage tank 210*a* and the negative electrode electrolyte storage tank 210*c* of each of the first to third individual storages 200A to 200C and the second common storage 300B can be used as storage tanks for electrolytes that are charged with power for a business continuity plan.

In addition, the redox flow battery system 10 of Embodiment 2 may include the first common storage 300A and the fourth redox flow discharger 400D.

Each of the first to third individual storages 200A to 200C, the first common storage 300A, and the second common storage 300B may include a plurality of positive electrode electrolyte storage tanks 210*a* and a plurality of negative electrode electrolyte storage tanks 210*c*. When configured in this manner, it is possible to separate electrolytes stored in each storage into electrolytes stored in the plurality of storage tanks and, while circulating electrolytes from storage tanks storing electrolytes having a high charging depth to a redox flow discharger and discharging power from the electrolytes, circulate electrolytes from storage tanks storing electrolytes having a low charging depth to a redox flow charger and charge the electrolytes.

Figure 10:
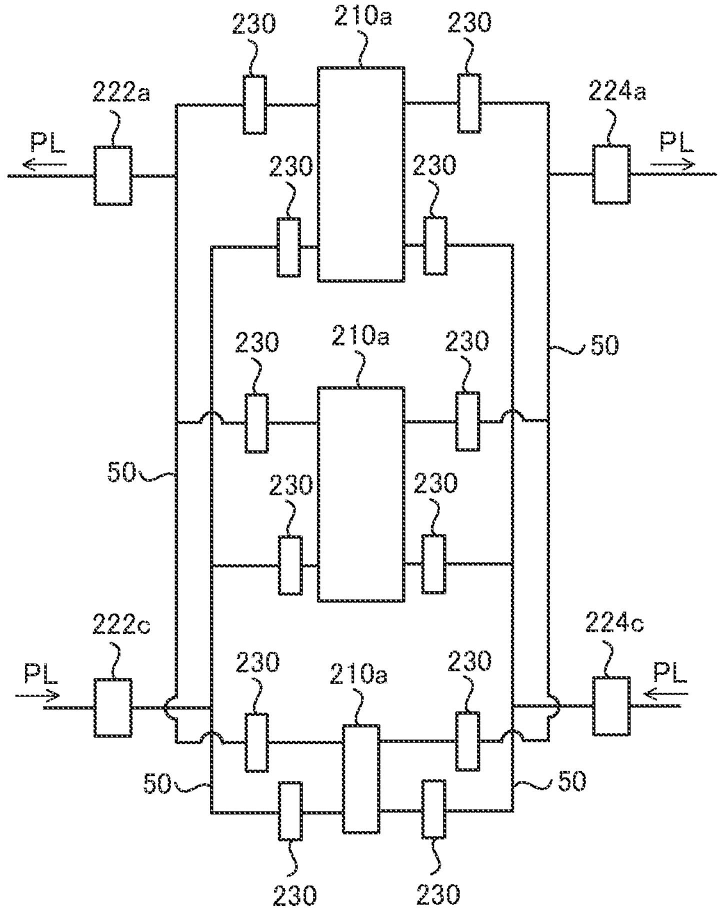
FIG. 10 is a schematic diagram illustrating an example of positive electrode electrolyte storage tanks according to a modified example.

Capacity of a positive electrode electrolyte storage tank 210*a* among the plurality of positive electrode electrolyte storage tanks 210*a* may be made smaller than capacities of the other positive electrode electrolyte storage tanks 210*a*, as illustrated in FIG. 10. In addition, capacity of a negative electrode electrolyte storage tank 210*c* among the plurality of negative electrode electrolyte storage tanks 210*c* may be made smaller than capacities of the other negative electrode electrolyte storage tanks 210*c*. By rapidly increasing the depth of charge of electrolytes in the positive electrode electrolyte storage tank 210*a* and the negative electrode electrolyte storage tank 210*c* having small capacities, a sudden power interchange in a short period of time can be coped with.

The amounts of electrolytes stored in the first to third individual storages 200A to 200C, the first common storage 300A, and the second common storage 300B, outputs from the first to third redox flow charging cells 110A to 110C and the first to fourth redox flow discharging cells 410A to 410D, and the like may be set according to the amount of power supplied to power consumers, characteristics of power source types, or the like. For example, when it is assumed that the power source type A is solar power generation and is capable of generating power for eight hours in the daytime, in order to continuously supply a power consumer with a predetermined power for 24 hours, the output from the first redox flow charging cell 110A is preferably set to three times the output from the first redox flow discharging cell 410A or more since the redox flow battery system 10 is capable of performing charging and discharge in parallel.

In addition, the charging depths of the electrolytes stored in the first to third individual storages 200A to 200C, the first common storage 300A, and the second common storage 300B are preferably 5% to 80% from a viewpoint of preventing development of a precipitate.

Figure 11:
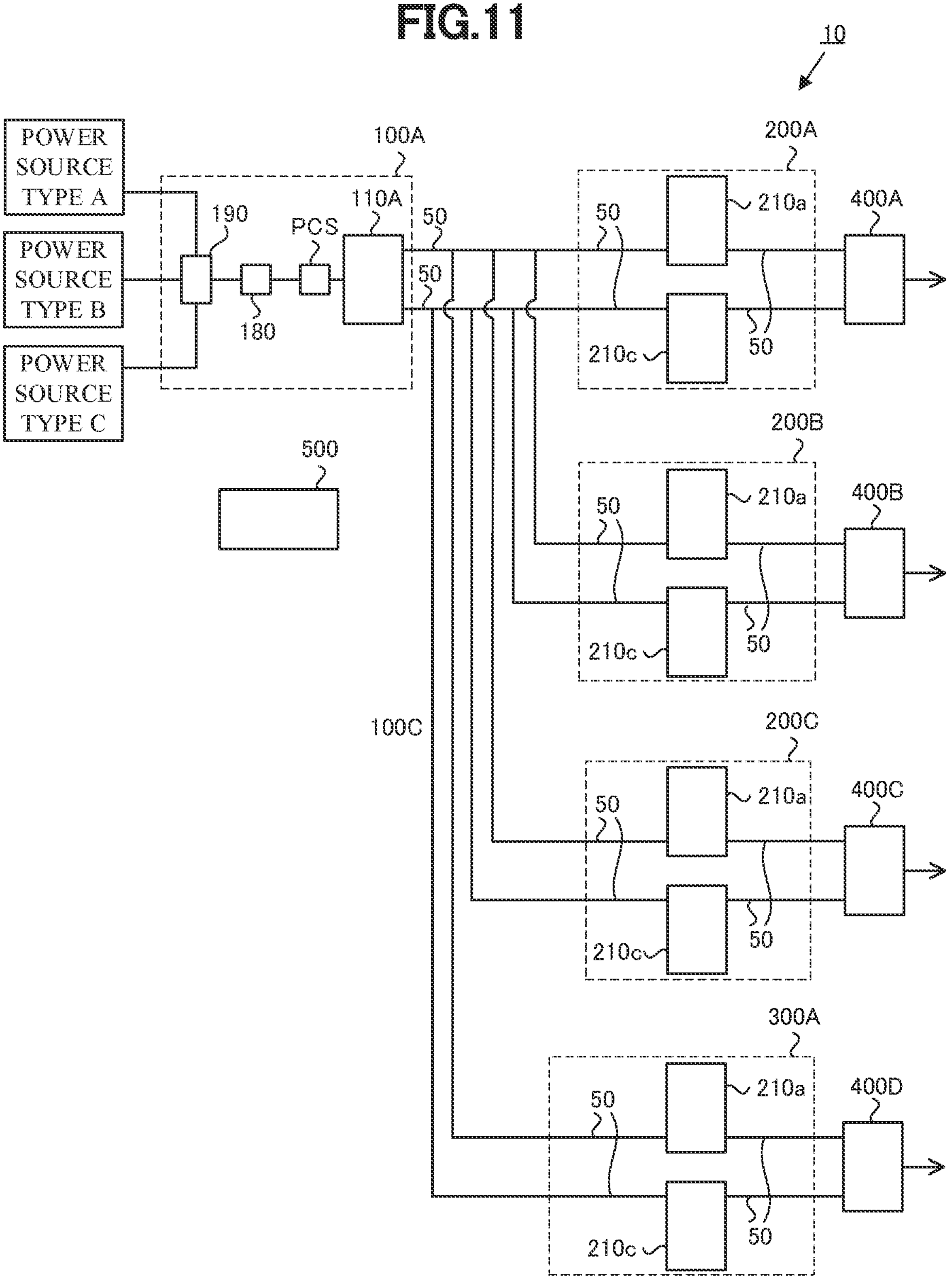
FIG. 11 is a schematic diagram of a redox flow battery system according to another modified example.

Although in Embodiments 1 and 2, the redox flow battery system 10 includes a plurality of redox flow chargers, the redox flow battery system 10 is only required to include at least one redox flow charger. For example, as illustrated in FIG. 11, a redox flow battery system 10 may include one first redox flow charger 100A, first to third individual storages 200A to 200C, a first common storage 300A, first to fourth redox flow dischargers 400A to 400D, and a controller 500. In the redox flow battery system 10 of the modified example, electrolytes that circulate in the first redox flow charger 100A (first redox flow charging cell 110A) and are charged with power are switched to electrolytes in any one of the first to third individual storages 200A to 200C and the first common storage 300A. In addition, a power source type that is connected to the first redox flow charger 100A (first redox flow charging cell 110A) and charges electrolytes with power is switched to one of the power source types A to C depending on circulating electrolytes (electrolytes in one of the first to third individual storages 200A to 200C and the first common storage 300A) by a power source switcher 190. When configured in this manner, the redox flow battery system 10 of the modified example is, as with the redox flow battery system 10 in Embodiment 1, capable of supplying power to which coloring is applied to a power consumer. In addition, surplus power of the power source types A and C can be effectively utilized. Further, a cost of the redox flow battery system 10 can be reduced.

In addition, the redox flow battery system 10 is only required to include at least one redox flow discharger. By switching connection to a power consumer in response to switching of electrolytes that circulate in the redox flow discharger and from which power is discharged, power to which coloring is applied can be supplied to each power consumer.

The controller 500 may include dedicated hardware, such as an application specific integrated circuit (ASIC), a field-programmable gate array (FPGA), and a control circuit. In this case, each piece of processing may be executed by an individual piece of hardware. In addition, respective pieces of processing may be collectively executed by a single piece of hardware. A portion of the processing may be executed by the dedicated hardware, and the other portion of the processing may be executed by software or firmware.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2021-160389, filed on Sep. 30, 2021, the entire disclosure of which is incorporated by reference herein.

REFERENCE SIGNS LIST

10 Redox flow battery system
50, **50*a*1 to 50*a*8, 50*c*1 to 50*c*8** Pipe
100A First redox flow charger
110A First redox flow charging cell
100B Second redox flow charger
110B Second redox flow charging cell
100C Third redox flow charger
110C Third redox flow charging cell
**115*a*** Positive electrode
**115*c*** Negative electrode
**120*a*** Positive electrode chamber
**120*c*** Negative electrode chamber
130 Membrane
180 Power meter
190 Power source switcher
200A First individual storage
200B Second individual storage
200C Third individual storage
**210*a*** Positive electrode electrolyte storage tank
**210*c*** Negative electrode electrolyte storage tank
**222*a*, 224*a*** Positive electrode pump
**222*c*, 224*c*** Negative electrode pump
230 Electromagnetic valve
240 Open circuit voltage measurer
300A First common storage
300B Second common storage
400A First redox flow discharger
410A First redox flow discharging cell
400B Second redox flow discharger
410B Second redox flow discharging cell
400C Third redox flow discharger
410C Third redox flow discharging cell
400D Fourth redox flow discharger
410D Fourth redox flow discharging cell
500 Controller
502 CPU
504 ROM
506 RAM
508 Input/output interface
A to C Power source type
PL Positive electrode electrolyte
NL Negative electrode electrolyte
PCS Power conditioner

The invention claimed is:

1. A redox flow battery system, comprising:

at least one redox flow charging cell connected to at least one power source type and configured to perform charging with power from the at least one power source type;

at least one redox flow discharging cell to discharge the power with which charging is performed by the redox flow charging cell;

a plurality of individual storages each to store an electrolyte that is charged with the power only from one power source type by the redox flow charging cell and circulate the electrolyte to the redox flow charging cell and the at least one redox flow discharging cell;

a common storage to store an electrolyte that is charged with power from at least two power source types by the redox flow charging cell and circulate the electrolyte to the redox flow charging cell and the at least one redox flow discharging cell; and a controller to switch an electrolyte that is charged by the redox flow charging cell between an electrolyte in one of the individual storages and an electrolyte in the common storage.

2. The redox flow battery system according to claim 1, wherein the controller switches an electrolyte that is charged by the redox flow charging cell between an electrolyte in one of the individual storages and an electrolyte in the common storage, based on charging depth of an electrolyte in the individual storage.

3. The redox flow battery system according to claim 1 or 2, wherein each of the individual storages includes a plurality of storage tanks to store the electrolyte, and capacity of one storage tank among the plurality of storage tanks is smaller than capacities of the other storage tanks.

4. A method for operating a redox flow battery system, the method comprising:

circulating, to at least one redox flow charging cell connected to at least one power source type and configured to perform charging with power from the at least one power source type, an electrolyte that is charged with the power only from one power source type and charging the electrolyte with the power;

switching an electrolyte that circulates in the redox flow charging cell from the electrolyte that is charged with the power only from the one power source type to an electrolyte that is charged with the power from at least two power source types;

charging a switched electrolyte, the electrolyte being charged with the power from the at least two power source types, with the power by the redox flow charging cell; and circulating one of the electrolyte that is charged with the power only from the one power source type and the electrolyte that is charged with the power from the at least two power source types to a redox flow discharging cell and discharging the power with which charging is performed from the redox flow discharging cell.

5. The redox flow battery system according to claim 2, wherein each of the individual storages includes a plurality of storage tanks to store the electrolyte, and capacity of one storage tank among the plurality of storage tanks is smaller than capacities of the other storage tanks.

* * * * *